United States Patent
Tsao et al.

(10) Patent No.: US 8,418,017 B2
(45) Date of Patent: Apr. 9, 2013

(54) ADAPTIVE ACKNOWLEDGMENT MECHANISM FOR NETWORK COMMUNICATION

(75) Inventors: Yeongtau Louis Tsao, Irvine, CA (US); Craig M. Mazzagatte, Aliso Viejo, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 290 days.

(21) Appl. No.: 12/873,308

(22) Filed: Aug. 31, 2010

(65) Prior Publication Data

US 2012/0054534 A1     Mar. 1, 2012

(51) Int. Cl.
*H04L 1/18*     (2006.01)
(52) U.S. Cl. ........ 714/749; 714/748; 714/776; 709/228; 370/252
(58) Field of Classification Search .................. 714/748, 714/749, 776; 709/228; 370/252
See application file for complete search history.

(56) References Cited

U.S. PATENT DOCUMENTS

| | | | |
|---|---|---|---|
| 5,710,976 | A | 1/1998 | Hill et al. |
| 6,771,659 | B1 | 8/2004 | Parantainen et al. |
| 6,959,320 | B2 | 10/2005 | Shah et al. |
| 7,286,476 | B2 | 10/2007 | Helmy et al. |
| 7,414,989 | B2 | 8/2008 | Kuchibhotla et al. |
| 7,415,032 | B2 | 8/2008 | Drottar et al. |
| 7,463,595 | B1 | 12/2008 | Singhal et al. |
| 7,474,642 | B1 | 1/2009 | Chheda |
| 7,493,383 | B1 | 2/2009 | Mukerji |
| 7,508,778 | B2 | 3/2009 | Yafuso |
| 7,522,587 | B2 | 4/2009 | Smiljanic |
| 7,539,175 | B2 | 5/2009 | White et al. |
| 7,653,856 | B2 | 1/2010 | Ahn et al. |
| 2004/0093420 | A1 | 5/2004 | Gamble |
| 2006/0190610 | A1 * | 8/2006 | Motegi et al. ................. 709/228 |
| 2006/0248145 | A1 | 11/2006 | Karmakar et al. |
| 2006/0256786 | A1 | 11/2006 | Bibr et al. |
| 2008/0086669 | A1 | 4/2008 | Cheng et al. |
| 2008/0268833 | A1 | 10/2008 | Huang et al. |
| 2009/0061880 | A1 | 3/2009 | Roberts et al. |
| 2009/0310493 | A1 * | 12/2009 | Nogami ........................ 370/252 |

FOREIGN PATENT DOCUMENTS

EP     1 780 926 A1     5/2007

OTHER PUBLICATIONS

Ricciato et al., "Bottleneck Detection Via Aggregate Rate Analysis: A Real Case in a 3G Network", IEEE/IFIP NOMS, 2006.

Nawab et al., "SEMPLAR: High-Performance Remote Parallel I/O Over SRB", vol. 1, pp. 366-373, Fifth IEEE International Symposium on Cluster Computing and the Grid, 2005.

* cited by examiner

*Primary Examiner* — Sam Rizk
(74) *Attorney, Agent, or Firm* — Fitzpatrick, Cella, Harper & Scinto

(57) ABSTRACT

The present disclosure is directed to network communication between a sender and a receiver. Network communication is established between the sender and the receiver using a first acknowledgment mechanism for signifying receipt of data by the receiver. The first acknowledgment mechanism is selected from one of a receiver positive acknowledgment mechanism (RPA) and a receiver negative acknowledgment mechanism (RNA). Communication information is monitored, wherein the communication information indicates at least a current state of performance for network communication. Based on the communication information, a message is exchanged between the sender and the receiver to negotiate a switchover to a second acknowledgment mechanism for signifying receipt of data by the receiver. The second acknowledgment mechanism is selected from the other of the receiver positive acknowledgment mechanism (RPA) and the receiver negative acknowledgment mechanism (RNA). Network communication is then established between the sender and the receiver using the second acknowledgment mechanism.

29 Claims, 13 Drawing Sheets

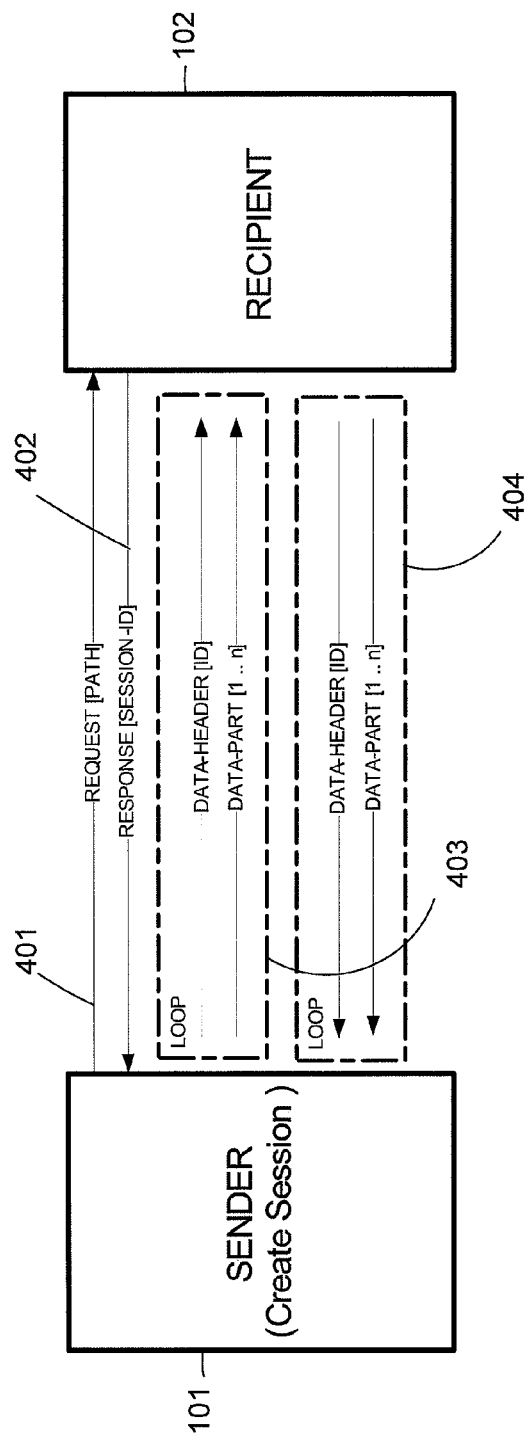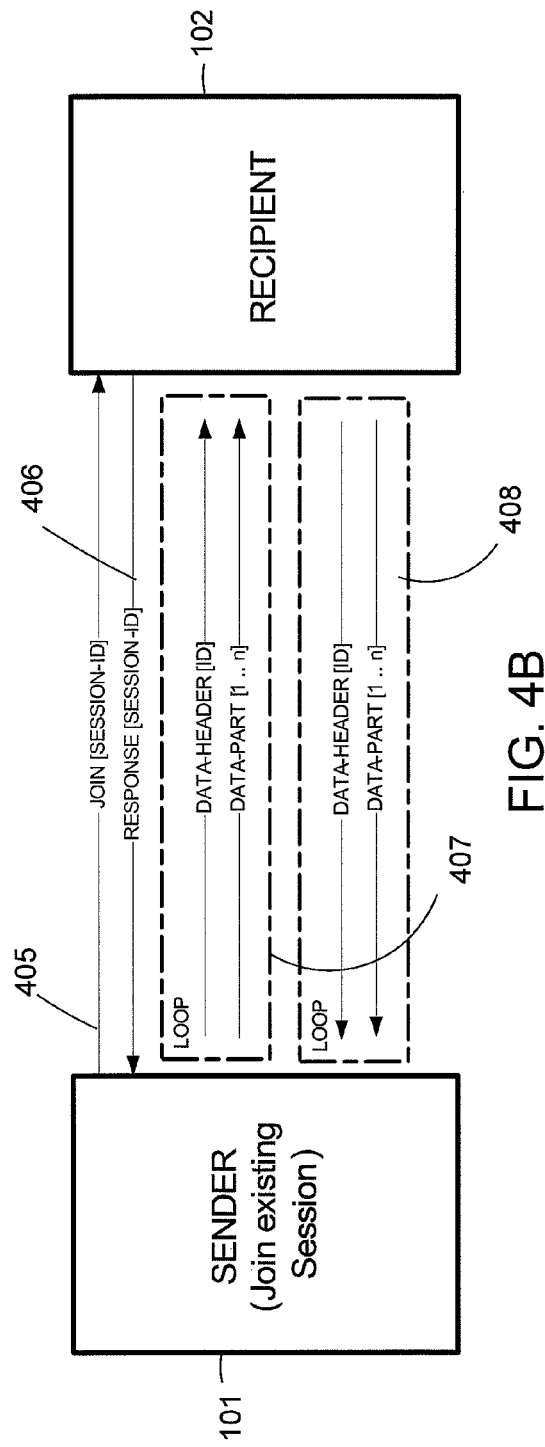

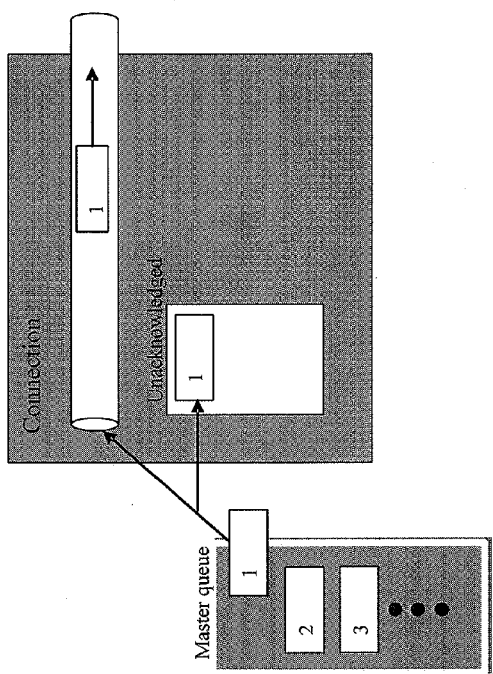
FIG. 10A
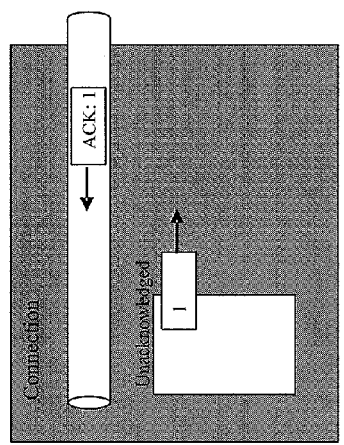
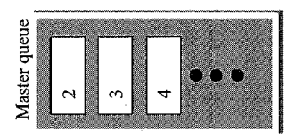
FIG. 10B

ADAPTIVE ACKNOWLEDGMENT MECHANISM FOR NETWORK COMMUNICATION

BACKGROUND

1. Field

The present disclosure generally relates to network communication between a sender and a receiver, and more specifically relates to network communication between a sender and a receiver using acknowledgments.

2. Description of the Related Art

When transferring data from a sender to a receiver over a network, reliability of the data transfer is often an issue. Here, "reliability" refers to verification that all data transmitted by the sender is received by the receiver.

Two distinct mechanisms have been developed to address the issue of reliability in data transfer: positive acknowledgment (ACK) and negative acknowledgment (NACK). In an ACK mechanism, the receiver notifies the sender that it has successfully received a data packet. If the sender does not receive an ACK message from the receiver within a period of time, which might be related to network round trip time (RTT), or if the sender's memory buffer which holds unacknowledged data packets is substantially full, then the sender assumes that the data packet has been lost and resends it.

In a NACK mechanism, the receiver notifies the sender that a data packet that had been expected has not yet been received. In this latter regard, a NACK message might be triggered if the receiver realizes that there is a gap in sequence numbers of received data packets, and that the gap has persisted for more than a pre-agreed time, which might be related to network RTT, or a NACK message might be triggered if the receiver's memory buffer becomes substantially full. Upon receipt of a NACK message, the sender will re-send the data packet.

SUMMARY

Each of the ACK mechanism and the NACK mechanism has its disadvantages. With respect to an ACK mechanism, one disadvantage is that many ACK messages are needed to confirm receipt of each and every data packet. With regard to a NACK mechanism, one disadvantage is that it requires the sender to maintain significantly more data packets cached in memory as compared to an ACK mechanism.

In the present disclosure, the foregoing problems are addressed by negotiating a switchover from a first acknowledgment mechanism to a second acknowledgment mechanism based on communication information. The first and second acknowledgments are selected from one of a receiver positive acknowledgment mechanism (RPA) and a receiver negative acknowledgment mechanism (RNA).

Thus, in an example embodiment described herein, network communication is established between the sender and the receiver using a first acknowledgment mechanism for signifying receipt of data by the receiver. The first acknowledgment mechanism is selected from one of a receiver positive acknowledgment mechanism (RPA) and a receiver negative acknowledgment mechanism (RNA). Communication information is monitored, wherein the communication information indicates at least a current state of performance for network communication between the sender and the receiver. Based on the communication information, a message is exchanged between the sender and the receiver to negotiate a switchover to a second acknowledgment mechanism for signifying receipt of data by the receiver. The second acknowledgment mechanism is selected from the other of the receiver positive acknowledgment mechanism (RPA) and the receiver negative acknowledgment mechanism (RNA). Network communication is then established between the sender and the receiver using the second acknowledgment mechanism, based on the negotiation between the sender and the receiver.

By virtue of the foregoing arrangement, it is ordinarily possible to reduce acknowledgment-related traffic over a network when sending data from a sender to a receiver, without negatively affecting reliability of the data transfer. More specifically, in a case where a data loss ratio is low, network traffic, caused at least partially by receiver positive acknowledgments, can be reduced by negotiating a switchover from an RPA mechanism to an RNA mechanism. In addition, an advantageous effect can be obtained by the foregoing arrangement in that a reduction can be made to an amount of data to be stored by the sender. More particularly, in a case where a data loss ratio is high and the sender has low memory available to hold data, a reduction can be made to an amount of data to be stored by the sender by negotiating a switchover from an RNA mechanism to an RPA mechanism. As a result of the foregoing, a hybrid system is provided that switches between RPA and RNA mechanisms based on system performance information, so as to efficiently transfer data from a sender to a receiver while maintaining reliability of receipt of the transferred data.

In an example embodiment also described herein, the communication information includes at least one of a count of re-send operations for failed transmissions from sender to receiver, a monitor of network bandwidth relative to an I/O storage system at the receiver, and a monitor of available memory at the sender for caching of unacknowledged data packets.

In one case, the sender and the receiver negotiate a switchover from an RNA mechanism to an RPA mechanism responsive to a determination that the count of re-send operations exceeds a threshold count. The threshold count can be a pre-defined value, which is determined based on, for example, a size of the data being transferred, available memory for a set buffer size at the sender and/or receiver, a current condition of network congestion, and/or a number of available sockets at the sender and/or receiver. In addition, the sender and the receiver may negotiate a switchover from an RNA mechanism to an RPA mechanism responsive to a determination that the monitor of network bandwidth outperforms the I/O storage system of the receiver. Lastly, the sender and the receiver may negotiate a switchover from an RNA mechanism to an RPA mechanism responsive to a determination that the sender has insufficient memory for caching of unacknowledged data packets.

In another case, the sender and the receiver negotiate a switchover from an RPA mechanism to an RNA mechanism responsive to a determination that the count of re-send operations remains lower than a threshold count. Similar to the threshold count in the case of switching from an RNA mechanism to an RPA mechanism, the threshold count can be a pre-defined value, which is determined based on, for example, a size of the data being transferred, available memory for a set buffer size at the sender and/or receiver, a current condition of network congestion, and/or a number of available sockets at the sender and/or receiver. In addition, the sender and the receiver may negotiate a switchover from an RPA mechanism to an RNA mechanism responsive to a determination that the monitor of the I/O storage system of the receiver outperforms network bandwidth. Lastly, the sender and the receiver may negotiate a switchover from an RPA mechanism to an RNA mechanism responsive to a determination that the sender has adequate memory for caching of unacknowledged data packets.

In another example embodiment described herein, messages are exchanged between the sender and the receiver to negotiate a mutual agreement between the sender and the receiver for a switchover to a second acknowledgment mechanism for signifying receipt of data by the receiver. For example, in a situation where the receiver determines that the receiver's I/O storage system is outperforming network bandwidth and that the count of re-send operations remains lower than a threshold count during operation in an RPA mechanism, the receiver will send a message to the sender requesting a switch-over to RNA. If the sender agrees, for example, in a situation where it determines that it has a sufficiently large memory for caching unacknowledged data packets, then the sender will send a message to the receiver signifying a switchover to RNA.

In yet another example embodiment described herein, monitoring of the communication information is performed repeatedly by the sender and by the receiver, so as to trigger a renegotiation of an acknowledgment mechanism responsive to significant changes in communication information.

According to another example embodiment described herein, the sender and the receiver communicate over multiple data transport channels simultaneously. In this example embodiment, the communication information includes at least a monitor of aggregated network bandwidth relative to an I/O storage system at the receiver and/or an I/O storage system at the sender. In one situation, the sender and the receiver negotiate a switchover from an RNA mechanism to an RPA mechanism responsive to a determination that the monitor of aggregated network bandwidth outperforms the I/O storage system of the receiver. In another situation, the sender and the receiver negotiate a switchover from an RPA mechanism to an RNA mechanism responsive to a determination that the monitor of the I/O storage system of the receiver outperforms aggregated network bandwidth. Each of the switchover negotiation from an RNA mechanism to an RPA mechanism and the switchover negotiation from an RPA mechanism to an RNA mechanism is based at least partially on an available memory at the receiver for caching data packets.

In an additional example embodiment described herein, the negotiation of a switchover to the second acknowledgment mechanism is a progressive negotiation. In an RPA mechanism, a single RPA message can signify receipt of more than one data packet. Thus, in an example of implementing the progressive negotiation, when the re-send count is low compared to a threshold count, or the sender has a relatively large amount of memory available (but the available memory is not large enough to switch to an RNA mechanism), the sender can increase the number of data packets per RPA message. Alternatively, in the foregoing example, if the sender's available memory is limited and the network bandwidth is outperforming an I/O storage system of the receiver, the sender can decrease the number of data packets per RPA message.

In an RNA mechanism, the sender can make a determination to increase or decrease an amount of sent data packets to store in a memory, based on a re-send count and a size of the memory at the sender. Thus, in another example of the progressive negotiation, when a re-send count is low compared to a threshold count and the sender has a relatively large amount of available memory, the sender can determine to increase the amount of data packets to hold for a negative acknowledgment.

According to another example embodiment described herein, network communication is effected in multiple layers that include a transport layer or an application layer. In this example embodiment, monitoring communication information and negotiating a switchover to a different acknowledgment mechanism can be effected at the transport layer. Alternatively, monitoring communication information and negotiating a switchover to a different acknowledgment mechanism can be effected at the application layer. One advantage to effecting the monitoring of communication information and the negotiating of a switchover to a different acknowledgment mechanism at the application level is that it is easy for the application to monitor the communication information. On the other hand, when effecting the monitoring of communication information and negotiating of a switchover to a different acknowledgment mechanism at the transport layer, it may be more difficult to monitor the communication information.

This brief summary has been provided so that the nature of the disclosure may be understood quickly. A more complete understanding can be obtained by reference to the following detailed description and to the attached drawings.

BRIEF DESCRIPTION OF DRAWINGS

FIG. 4A is a view of a sender and a receiver for explaining an establishment of a primary connection between the sender and the receiver, according to an example embodiment.

FIG. 4B is a view of a sender and a receiver for explaining an establishment of a secondary connection between the sender and the receiver, according to an example embodiment.

FIGS. 10A and 10B are representative views of mechanisms for managing acknowledgments according to an example embodiment.

DETAILED DESCRIPTION

Figure 1:
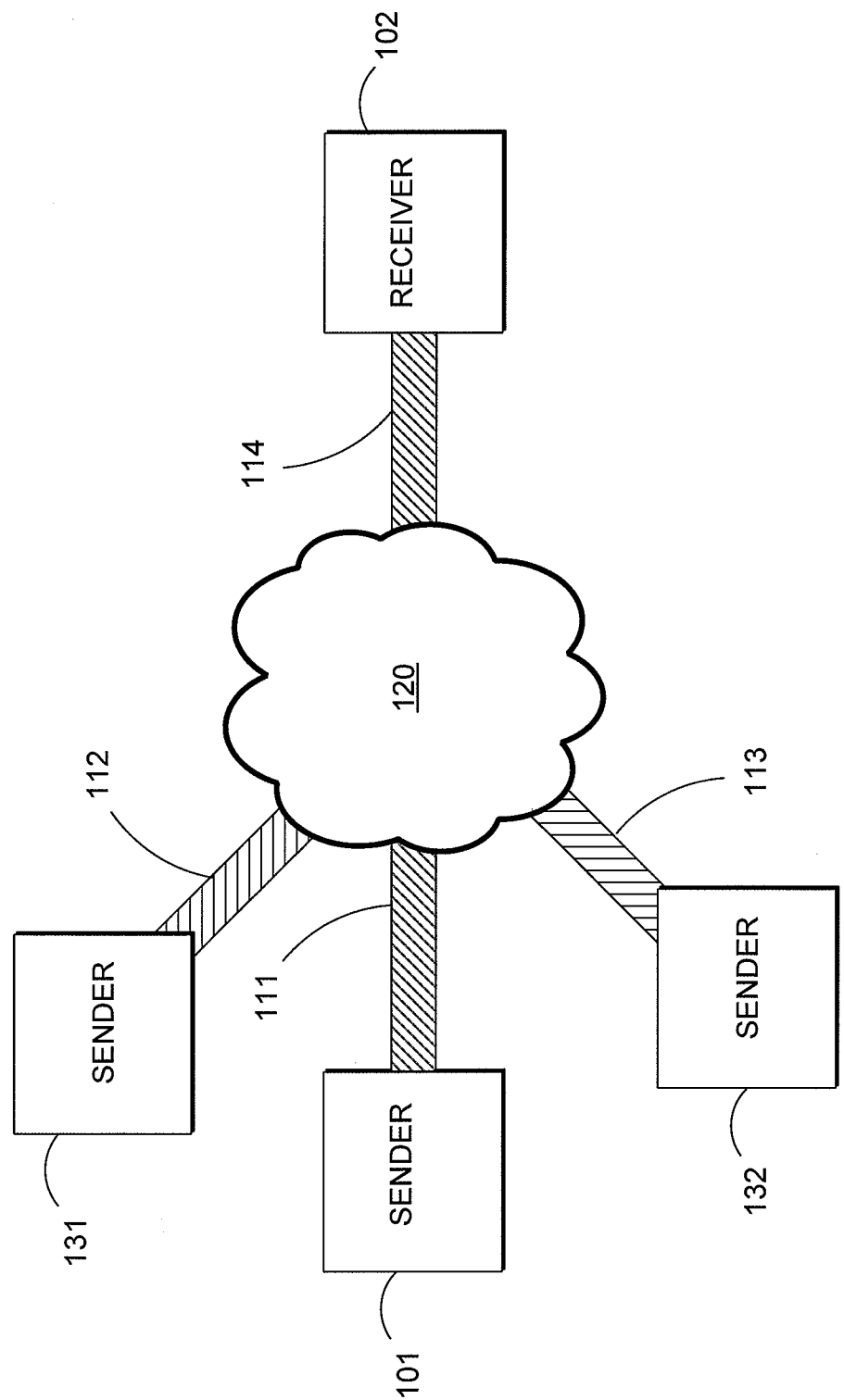
FIG. 1 is a representative view of multiple senders and a receiver, connected via a network, on which an architecture of an example embodiment may be implemented.

FIG. 1 is a representative view of a network architecture having multiple senders and a receiver, connected via a network. As shown in FIG. 1, senders 101, 131 and 132 are connected to receiver 102 through network 120. More specifically, sender 101 is connected to network 120 through network interface 111, sender 131 is connected to network 120 through network interface 112, sender 132 is connected to network 120 through network interface 113, and receiver 102 is connected to network 120 through network interface 114. In FIG. 1, senders 101, 131 and 132 are shown to be connected via one network; however, in other example embodiments, senders 101, 131 and 132 and receiver 102 can be connected via more than one network. In addition, there may be more or less than three senders and more than one receiver connected to network 120 or connected to multiple networks.

Network 120 is an intranet, but in other example embodiments, network 120 can be the Internet, or any other suitable type of network for transferring data.

Senders 101, 131 and 132 are devices that are capable of sending a mass transfer of data over a network. However, senders 101, 131 and 132 are not limited to sending data, and can also be devices capable of receiving transferred data. Senders 101, 131 and 132 can be, for example, computers, or any other device that is capable of sending a mass transfer of data over a network. In addition, senders 101, 131 and 132 may be a client device in a client-server system, or may be a peer device in a peer-to-peer system.

Receiver 102 is a device that is capable of receiving and sending a mass transfer of data over a network. Receiver 102 can be, for example, a computer, or any other device that is capable of receiving and sending a mass transfer of data over a network. In addition, receiver 102 may be a server device in a client-server system, or may be a peer device in a peer-to-peer system.

Network interfaces 111 to 114 can be wired or wireless physical interfaces. Each of network interfaces 111 to 114 includes one or more ports so as to establish one or more socket connections with the network 120.

Figure 2:
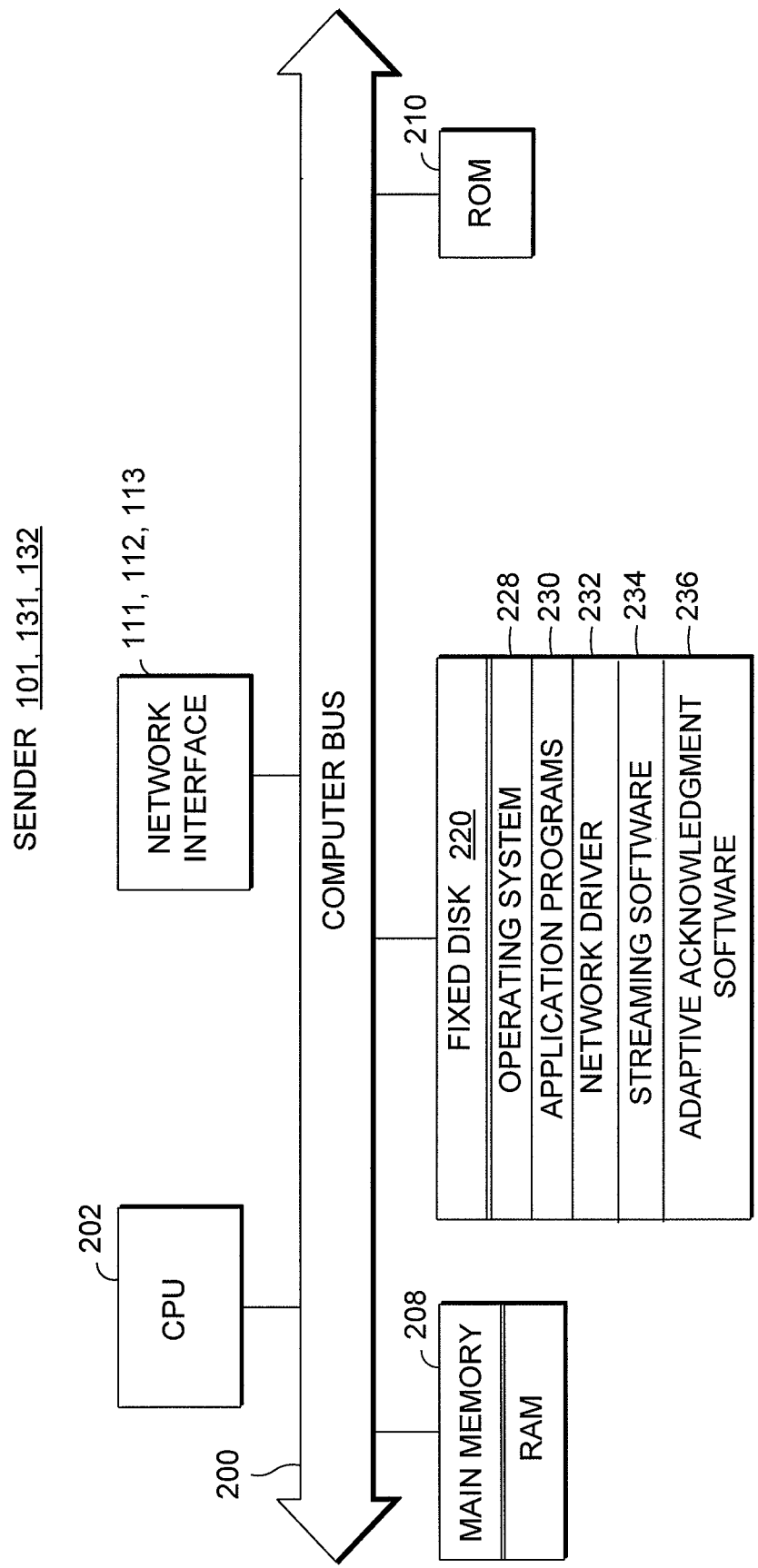
FIG. 2 is a detailed block diagram for explaining the internal architecture of a sender of FIG. 1.

FIG. 2 is a detailed block diagram for explaining the internal architecture of each of senders 101, 131 and 132 of FIG. 1. As shown in FIG. 2, each of senders 101, 131 and 132 may include central processing unit (CPU) 202 which interfaces with computer bus 200. Also interfacing with computer bus 200 are hard (or fixed) disk 220, network interface 111, 112 or 113, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sender 101, 131 or 132 or other programs. Hard disk 220 further contains network driver 232 for software interface to a network such as network 120. Hard disk 220 also contains streaming software 234 for controlling the sending of data from the sender. Lastly, hard disk 220 contains adaptive acknowledgment software 236 for controlling an acknowledgment mechanism between the sender 101 and the receiver 102, which will be described in greater detail below in connection with FIG. 13.

In an example embodiment, streaming software 234 and adaptive acknowledgment software 236 are loaded by CPU 202 into a region of RAM 208. CPU 202 then executes the stored streaming software 234 and adaptive acknowledgment software 236 from RAM 208 in order to execute the loaded computer-executable steps. In addition, application programs 230 are loaded by CPU 202 into a region of RAM 208. CPU 202 then executes the stored process steps as described in detail below in connection with FIG. 13, in order to execute the loaded computer-executable steps.

Figure 3:
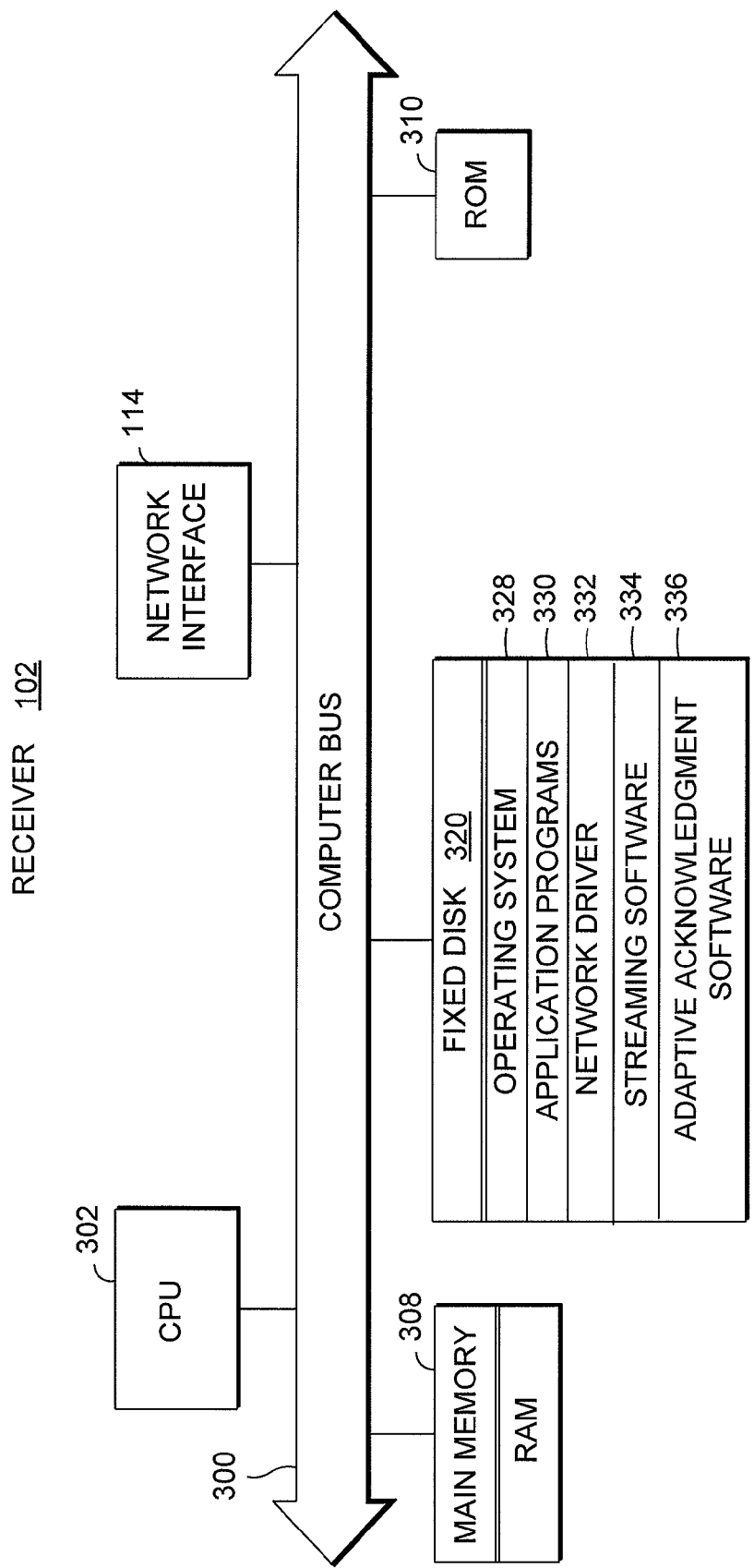
FIG. 3 is a detailed block diagram for explaining the internal architecture of the receiver of FIG. 1.

FIG. 3 is a detailed block diagram for explaining the internal architecture of the receiver 102 of FIG. 1. As shown in FIG. 3, receiver 102 includes central processing unit (CPU) 302 which interfaces with computer bus 300. Also interfacing with computer bus 300 are hard (or fixed) disk 320, network interface 114, random access memory (RAM) 308 for use as a main run-time transient memory, and read only memory (ROM) 310.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3, hard disk 320 contains operating system 328, application programs 330 such as programs for starting up and shutting down the receiver 102 or other programs. Hard disk 320 further contains network driver 332 for software interface to a network such as network 120. Hard disk 320 also contains streaming software 334 for controlling the receiving of data by the receiver 102. Lastly, hard disk 320 contains adaptive acknowledgment software 336 for controlling an acknowledgment mechanism between the sender 101 and the receiver 102, which will also be described in greater detail below in connection with FIG. 13.

In an example embodiment, streaming software 334 and adaptive acknowledgment software 336 are loaded by CPU 302 into a region of RAM 308. CPU 302 then executes the stored process steps of the streaming software 334 and adaptive acknowledgment software 336 from RAM 308 in order to execute the loaded computer-executable steps. In addition, the process steps of the application programs 330 are loaded by CPU 302 into a region of RAM 308. CPU 302 then executes the stored process steps as described in detail below in connection with FIG. 13, in order to execute the loaded computer-executable steps.

FIG. 4A is a view of a sender and a receiver for explaining an establishment of a primary connection between a sender and a receiver, according to an example embodiment. A Parallel Data Protocol (PDP) is provided that utilizes multiple Transmission Control Protocol (TCP) connections via multiple sockets to send and receive data between the sender 101 and the receiver 102. However, other multiple connection systems (i.e., any logical connection endpoint over any connection-oriented protocol) for multi-stream data transport may be utilized, so long as the receiver collects data into a memory buffer before the data is written into a storage system, which will be described in greater detail below in connection with FIG. 5. In FIG. 4A, only sender 101 is shown; however, in other example embodiments, more than one sender may be forming connections with receiver 102 such as senders 131 and 132.

In FIG. 4A, the example PDP implemented is a proprietary, light-weight binary request/response based protocol which allows for sending and receiving of data via multiple streams (e.g., TCP connections). Before actual data transfer can occur, the sender 101 first sends a request message to the receiver 102 (401). The request message includes a requested URI (path) that is registered with the receiver 102. When the receiver 102 receives a valid request message, the receiver 102 replies with a response message that includes a unique session id assigned by the receiver 102 which can be used by the sender 101 for opening up data transfer connections (402). The foregoing described steps 401 and 402 start a first socket at the receiver 102 to establish a session for transferring data.

In the response message sent by the receiver 102, the receiver 102 includes a number of connections which the sender 101 is allowed to join in the established session. If the sender 101 attempts to join more than the provided number of connections, the receiver 102 can reject the additional join requests. In addition, the response message can include a length of life time for the established session. In this case, after expiration of the included life time, the sender 101 stops and terminates this secondary connection.

If the receiver 102 is busy, the receiver 102 returns to the sender 101a time period to wait before attempting to create the session again. The sender 101 then sends the subsequent create session request based on the time given by the receiver 102. If the sender 101 sends the subsequent create session request before the specified time period has expired, the receiver 102 will reject the request for creating the session.

Once the session is created, data can then be sent from the sender 101 to the receiver 102 (403), and data can be sent from the receiver 102 to the sender 101 (404). The data sent between the sender 101 and the receiver 102 includes a data-header id and a number of data parts to be sent.

FIG. 4B is a view of a sender and a receiver for explaining an establishment of a secondary connection between the sender and the receiver, according to an example embodiment. In FIG. 4B, during a given established session, as described above in FIG. 4A, a sender 101 can join the existing data-transfer session by sending a join request to open a new connection with the receiver 102 and by providing a valid session id (405). If the sender 101 provides a valid session id, then the receiver 102 returns a response message that includes a join session id (406). In addition, the response message can include a status change that includes the current session's time-alive and an updated list of join sessions.

Once the join session is created, data can be sent from the sender 101 to the receiver 102 (407), and data can be sent from the receiver 102 to the sender 101 (408). The data sent between the sender 101 and the receiver 102 includes a data-header id and a number of data parts to be sent.

In some cases, in step 406 of FIG. 4B, the receiver 102 may send a response message that rejects the join request from the sender 101. The receiver 102 may reject the join request, for example, because the request exceeds the number of connections allowed which was provided by the receiver in FIG. 4A. In these cases, the response message includes the number of connections allowed for the current session. In addition, the response message can include a time period (e.g., a number of seconds) that the sender 101 should wait before trying to join the session again. In this regard, the sender 101 may start a new join request after the number of seconds provided by the receiver 102 have passed.

Figure 5:
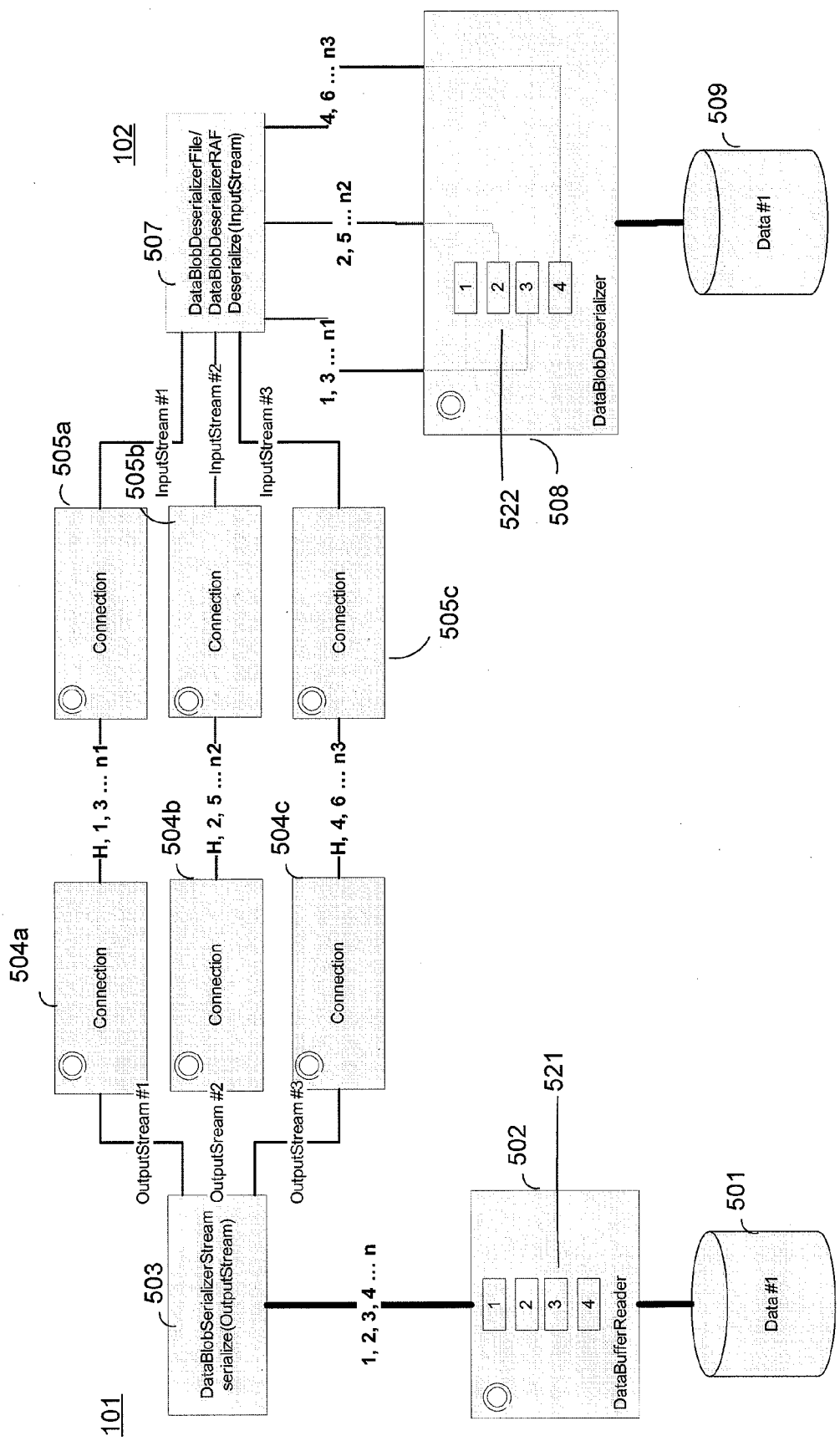
FIG. 5 is another view of a sender and a receiver for providing a general explanation of sending data from the sender to the receiver according to an example embodiment.

FIG. 5 is another view of a sender and a receiver for providing a general explanation of sending data from the sender to the receiver according to an example embodiment. In FIG. 5, sender 101 includes an I/O storage system that includes a storage medium 501 such as a disk that stores data, a data buffer reader 502 that includes a data buffer 521, and a data blob serializer 503 for transmitting data. The data buffer 521 may be, for example, a circular buffer which is a data structure that uses a single, fixed size buffer as if it were connected end-to-end. The sender 101 is connected to the receiver 102 via connections 504a and 505a, via connections 504b and 505b, and via connections 504c and 505c. The receiver 102 includes an I/O storage system that includes a storage medium 509 such as a disk, a data blob deserializer 508 that includes a data buffer 522, and a data blob deserializer file 507 for receiving transmitted data.

In FIG. 5, actual reading of source data is accomplished asynchronously using a separate thread that fills in the storage medium 501 with data to be transmitted by the sender 101. Data is read from the storage medium 501 by the data buffer reader 502 and stored in the data buffer 521. Each sender connection 504a, 504b and 504c de-queues a next available data chunk from the data buffer 521. The data buffer reader 502 reads data from the data buffer 521, and the data blob serializer 503 transmits the next available data chunk over the particular connection that de-queued the next available data chunk. The transmitted data chunk is received over the corresponding one of the receiver connections 505a, 505b and 505c. The data blob deserializer file 507 receives the transmitted data chunks from the receiver connections 505a, 505b and 505c. The data blob deserializer 508 stores the data in the data buffer 522, and re-creates the original file by putting the data chunks into the correct order. The data blob deserializer 508 then uses a background thread to write data to the storage medium 509.

For performance reasons, the data blob deserializer 508 caches some data in the data buffer 522, preferring to write data to the storage medium 509 when the data is placed in the original ordering. In some cases, when the ordering of data sent across different connections becomes far out of order, the data blob deserializer 508 will seek to different positions in the output file and write data to the storage medium 509 to prevent exhausting process memory with cached data. In this regard, a seek operation may take, for example, 10,000,000 ns.

An example architecture used for transporting data is described in detail in U.S. Application titled "Mechanism for Autotuning Mass Data Transfer from a Sender to a Receiver Over Parallel Connections", by Craig Mazzagatte, et al., filed on the same date herewith, identified as Ser. No. 12/873,305, the contents of which are incorporated by reference herein. The example architecture described in the U.S. Application titled "Mechanism for Autotuning Mass Data Transfer from a Sender to a Receiver Over Parallel Connections" Ser. No. 12/873,305 is a Mass Data Transfer-Parallel Data Protocol (MDT-PDP) transport component that acts as a transport handler for a Soap Connection Library subsystem within an application. This includes transferring SOAP requests and responses. The MDT-PDP transport is functionally equivalent to the Soap Connection Library default HTTP-based transport from the point-of-view of a SOAP Connection Library client and a SOAP Connection Library service. However, the disclosure provided herein is not limited to the foregoing example architecture, and any transport protocol may be implemented so long as the features of the claims are achieved.

The objective of the SOAP Connection library is to offer provider (i.e., recipient) function and client function of the SOAP message based Web service. The provider function is a function that provides the Web service to execute specific processes and provide information for accessing. Whereas, the client function is a function to access the Web service. The Web service using SOAP Connection Library is not only the client using SOAP Connection Library but it also enables the processing of a request from the client that uses Microsoft .NET Framework and other Web service frameworks. Similarly, the client function is not only the Web service using SOAP Connection Library, but it enables the execution of a request related to Web service that uses .NET Framework and other Web service frameworks.

Figure 6:
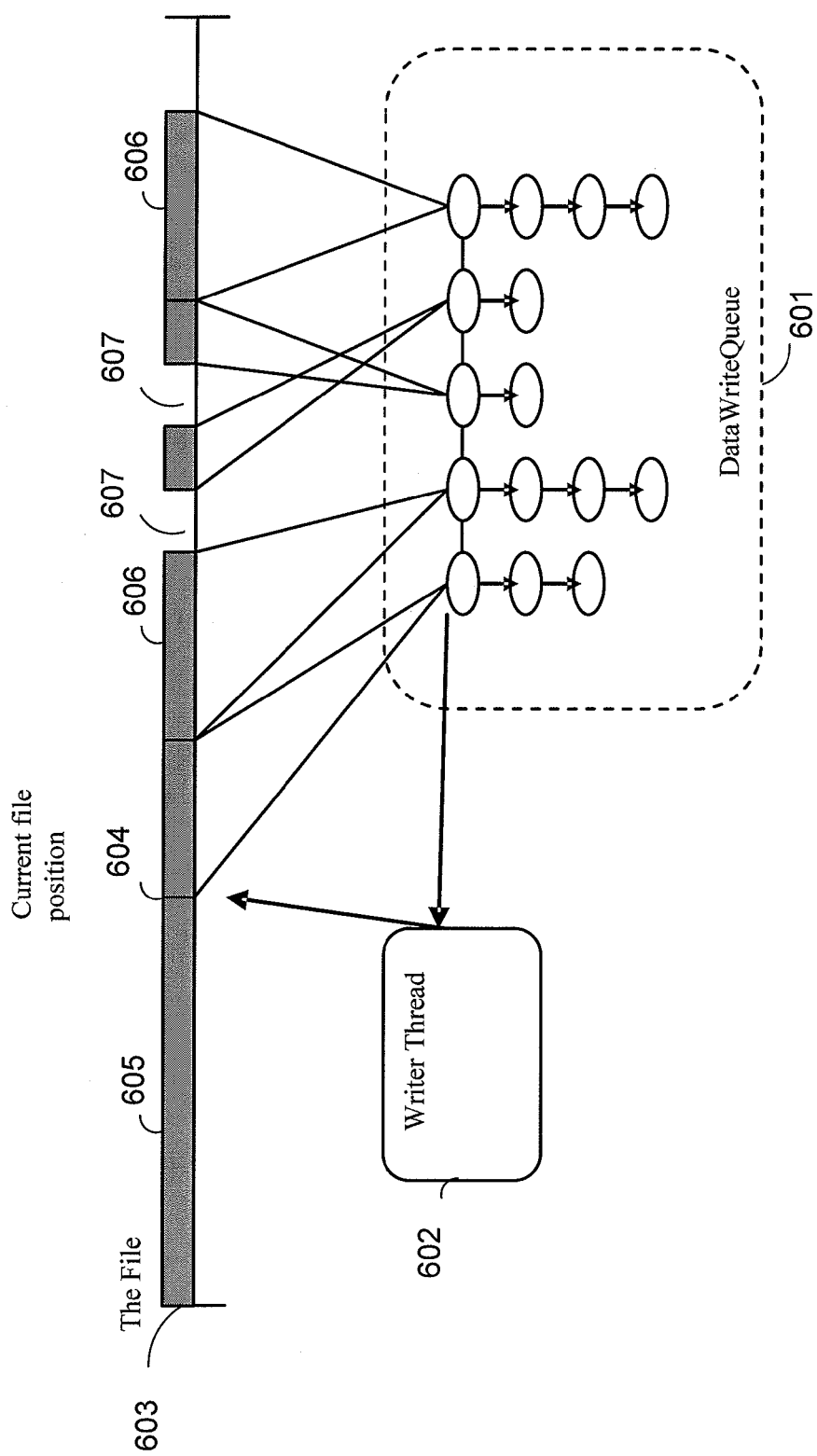
FIG. 6 is a representative view of a writing operation in an I/O storage system of the receiver of FIG. 1.

FIG. 6 is a representative view of a writing operation in an I/O storage system of the receiver 102 of FIG. 1. Generally, in a parallel connection data transfer system, the I/O storage system of the receiver can be a bottleneck to a mass transfer of data, and more particularly, a disk included in the I/O storage system can be a bottleneck to a mass transfer of data. In this regard, when a file is divided into small pieces or chunks and is delivered over separate connections, the data may not arrive in order at the receiver, especially as a number of connections is increased. If the receiver times out waiting for a next consecutive data chunk to arrive, before writing the data to a disk, a data buffer of the receiver may get full. If the data buffer of the receiver gets full, then the I/O storage system of the receiver may be forced to do a disk write for out of order data which might require additional seek operations. Performing additional seek operations would further increase a time it takes to transfer data if the I/O storage system of the receiver is a bottleneck to the transfer of data. In addition, the foregoing might also trigger data re-send events from the sender, due to lack of acknowledgments (i.e., for the data lost due to receiver buffers being full) adding further delays to the transfer of data. In this scenario, the receiver can stop accepting new connection requests, and can also reduce an existing number of connections to possibly avoid a full buffer condition, which in turn may avoid further costly seek operations.

When sending data over plural connections, a many-to-one relationship exists between the connections between the sender 101 and the receiver 102 and an output file. That is, data transferred in multiple concurrent connections is funneled into a single file. Within each connection at the receiver receiving data, a thread is started to read all data chunks from the inbound connection associated with the single file. An N number of parallel connections transferring chunks for the same file all invoke a deserialize method on the same data blob deserializer file 507 as shown in FIG. 5. The data blob deserializer's (of FIG. 5) task is then to read all data chunks associated with the file from all N connections, and transferring the data to the storage medium 509 of FIG. 5 in an efficient manner.

As shown in FIG. 6, a DataWriteQueue 601 stores data in the form of DataWriteObjects which are represented by ovals. In FIG. 6, a writer thread 602 writes the DataWriteObjects to a file. Reference number 603 represents the beginning of the file. Moreover, data already written to the file is represented as reference number 605. Areas 606 represent areas in which data has already been received, but has not yet been written to the file. Areas 607 represent areas where data has not yet been received. The DataWriteQueue 601 is also a thread-safe blocking queue implementation. An instance monitor is used as synchronization lock for remove( ) and insert( ) methods.

In FIG. 6, a current file position is available for the writer thread 602 to write data to the file. However, it is possible that no such DataWriteObject is present in the DataWriteQueue 601 for the current file position 605. Since different connections are used to transport data from different areas of the file, it is possible for a particular area of the file to have not yet been received by the time the writer thread 602 is ready to write that particular area of the file to disk. This may indicate that the memory buffer is not large enough to accommodate temporary chunk data before writing to storage, which in turn means that a seek operation might be performed. This usually means that data transfer rates from the sender 101 to the receiver 102 are faster compared to the processing I/O storage system.

More specifically, if the writer thread 602 is allowed in this scenario to write a different area of the file to disk, then the writer thread 602 will perform a seek operation which is to be avoided. On the other hand, if the writer thread 602 blocks indefinitely, waiting an unlimited amount of time for a DataWriteObject to be presented to the queue by one of the connections, then there is potential for inefficiency as well. This is especially true when a faster network is employed and a disk of the I/O storage system is a bottleneck in the transfer of data. In this case, the more the writer thread 602 is made to wait, the more inefficient the transfer becomes.

To provide an efficient transfer of data, two things are balanced: (1) writing data to the disk frequently, which means allowing the writer thread 602 to remain unblocked frequently, and (2) avoiding file seek operations, which means sometimes blocking the writer thread 602 to wait until data for the current file position is read from one of the connections.

The above-mentioned balancing is performed in the DataWriteQueue 601. When the DataWriteObject for the current file position 604 is not available, the DataWriteQueue employs, for example, the following heuristic, which tends to substantially avoid unnecessary seek operations, and also tends to substantially avoid unnecessary blocking of the writer thread 602: If a DataWriteObject is not available for the current file position: (1) Wait up to 2 seconds for the requested DataWriteObject to be added to the DataWriteQueue 601 by a reader thread; (2) If the requested DataWriteObject becomes available within the 2 second timeout period, then return it; and (3) If the requested DataWriteObject does not become available within the 2 second timeout period, then return to the writer thread 602 the DataWriteObject with the lowest absolute offset that is available. This heuristic attempts to balance keeping the writer thread writing to the disk against avoiding file seek operations. However, seek operations may not be avoided entirely, and for better performance of data transfer, the receiver 102 may block join requests from the sender 101 and request that the sender 101 close one or more secondary connections.

When there are fewer DataWriteObjects in memory (i.e., representing data not yet written to file by the writer thread 602), it is less likely that a DataWriteObject representing the current file position 604 is available. If the writer thread 602 is allowed to write one of the available DataWriteObjects to file in this scenario, it is more likely to require a seek operation on the file. Therefore, when the DataWriteQueue 601 is near empty, the writer thread 602 is blocked when it tries to remove DataWriteObjects, so as to allow the DataWriteQueue 601 to be filled to a minimum level by the connection reader threads.

In a different scenario, reader threads may be blocked when trying to add DataWriteObjects to the DataWriteQueue 601. In this scenario, when the DataWriteQueue 601 is filled with a very large number of DataWriteObjects, then a connection reader thread (not shown) that tries to add another DataWriteObject to the DataWriteQueue 601 will be blocked. This allows the writer thread 602 to write some of the DataWriteObjects to disk.

Internally, the DataWriteQueue 601 utilizes a ConsumerProducerThrottle object (not shown) to decide when the foregoing described blocking scenarios have occurred. When the writer thread 602 requests to remove a DataWriteObject from the DataWriteQueue 601, the DataWriteQueue notifies the ConsumerProducerThrottle object of the request. The ConsumerProducerThrottle object blocks the writer thread 602 if the DataWriteQueue 601 does not have a minimum number of DataWriteObjects in it. Once the DataWriteQueue 601 is filled with enough DataWriteObjects, the ConsumerProducerThrottle releases the writer thread 602.

Alternatively, when the reader thread requests to add a new DataWriteObject to the DataWriteQueue 601, it may be that the DataWriteQueue 601 has reached a maximum number of DataWriteObjects. In this scenario, the reader thread is blocked until the writer thread 602 has a chance to remove DataWriteObjects from the DataWriteQueue 601. Again, the DataWriteQueue 601 utilizes its ConsumerProducerThrottle object to decide when the foregoing scenario has occurred. When the reader thread adds a DataWriteObject to the DataWriteQueue 601, the DataWriteQueue 601 notifies the ConsumerProducerThrottle that DataWriteObject is being added. If the ConsumerProductThrottle decides that the DataWriteQueue 601 has reached its maximum number of DataWriteObjects, then the ConsumerProductThrottle blocks the reader thread. The reader thread stays blocked until the number of DataWriteObjects in the queue is reduced.

The ConsumerProducerThrottle object is an interface object that defines a contract for DataWriteObjectThrottle (not shown) to implement. The DataWriteObjectThrottle allows an application to configure a memory buffer size for caching unrealized data in the memory before writing to disk storage. The DataWriteObjectThrottle also includes current and consumed memory buffer information.

Figure 7:
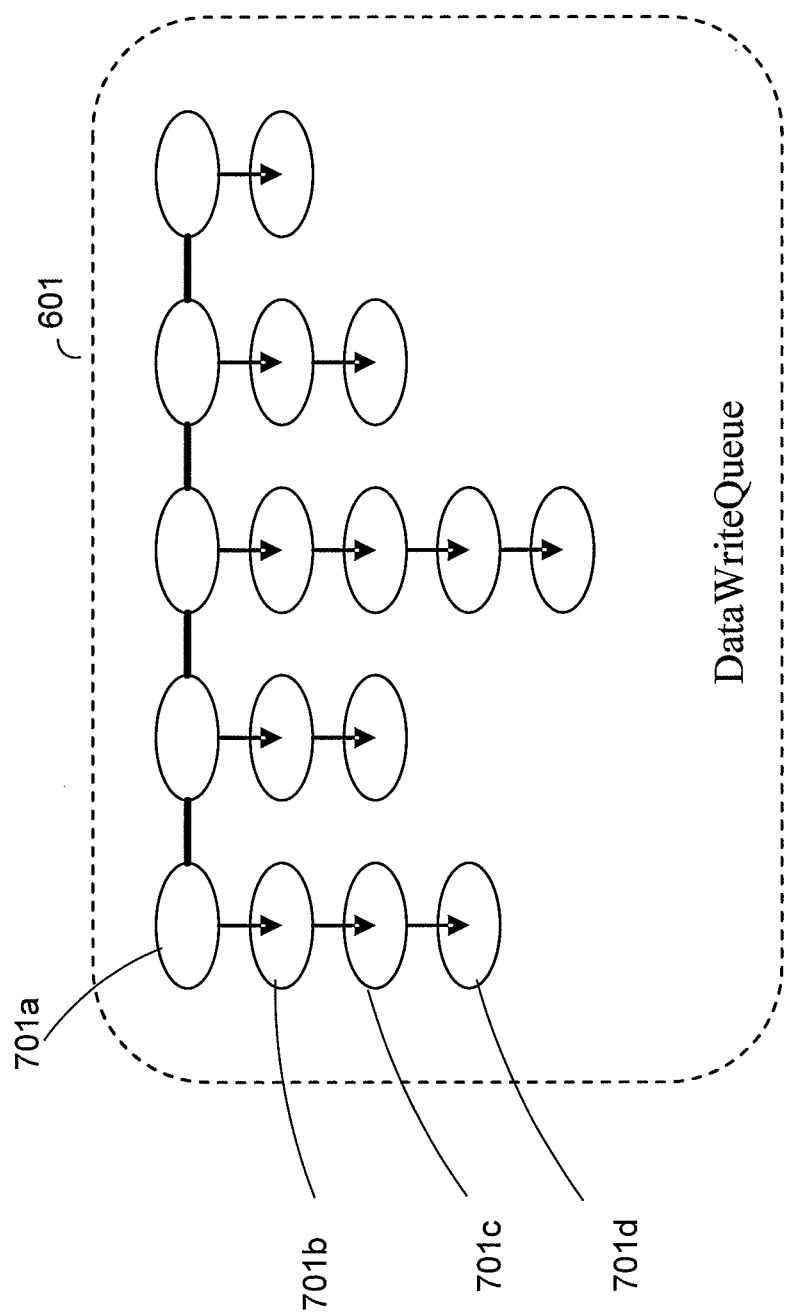
FIG. 7 is a representative view of the DataWriteQueue 601 as shown in FIG. 6.

FIG. 7 is a representative view of the DataWriteQueue 601 as shown in FIG. 6. In FIG. 7, the DataWriteQueue 601 is shown after receiving several DataWriteObjects, for example, DataWriteObjects 701a to 701d. In this example, the DataWriteObjects are organized into 5 chains, representing 5 contiguous areas of the file. DataWriteObjects 701a to 701d represent one of the five chains. Generally, the DataWriteQueue 601 acts as a synchronization and organization point for the N reader threads. To avoid seek operations, the DataWriteQueue automatically detects sets of DataWriteObjects representing contiguous areas of the file. When the DataWriteQueue 601 receives multiple DataWriteObjects representing a contiguous area of the file, the DataWriteQueue 601 collects the DataWriteObjects into a single chain internally, regardless of which connection each DataWriteObject comes from. The DataWriteQueue thus stores DataWriteObjects as an unordered set of DataWriteObject chains.

When the writer thread 602 of FIG. 6 removes DataWriteObjects from the DataWriteQueue, the writer thread 602 indicates the current file position. To possibly avoid a file seek operation, the DataWriteQueue 601 provides a DataWriteObject whose offset is the current file position 604. The writer thread 602 may then write to the current file position 604 without performing a seek operation. Internally, the DataWriteQueue 601 maintains a collection of M DataWriteObject chains, representing contiguous areas of the file. The DataWriteQueue 601 checks the beginning offsets of the M DataWriteObject chains, and if there is a chain whose initial offset matches the current file position, then the entire chain is returned.

Figure 8:
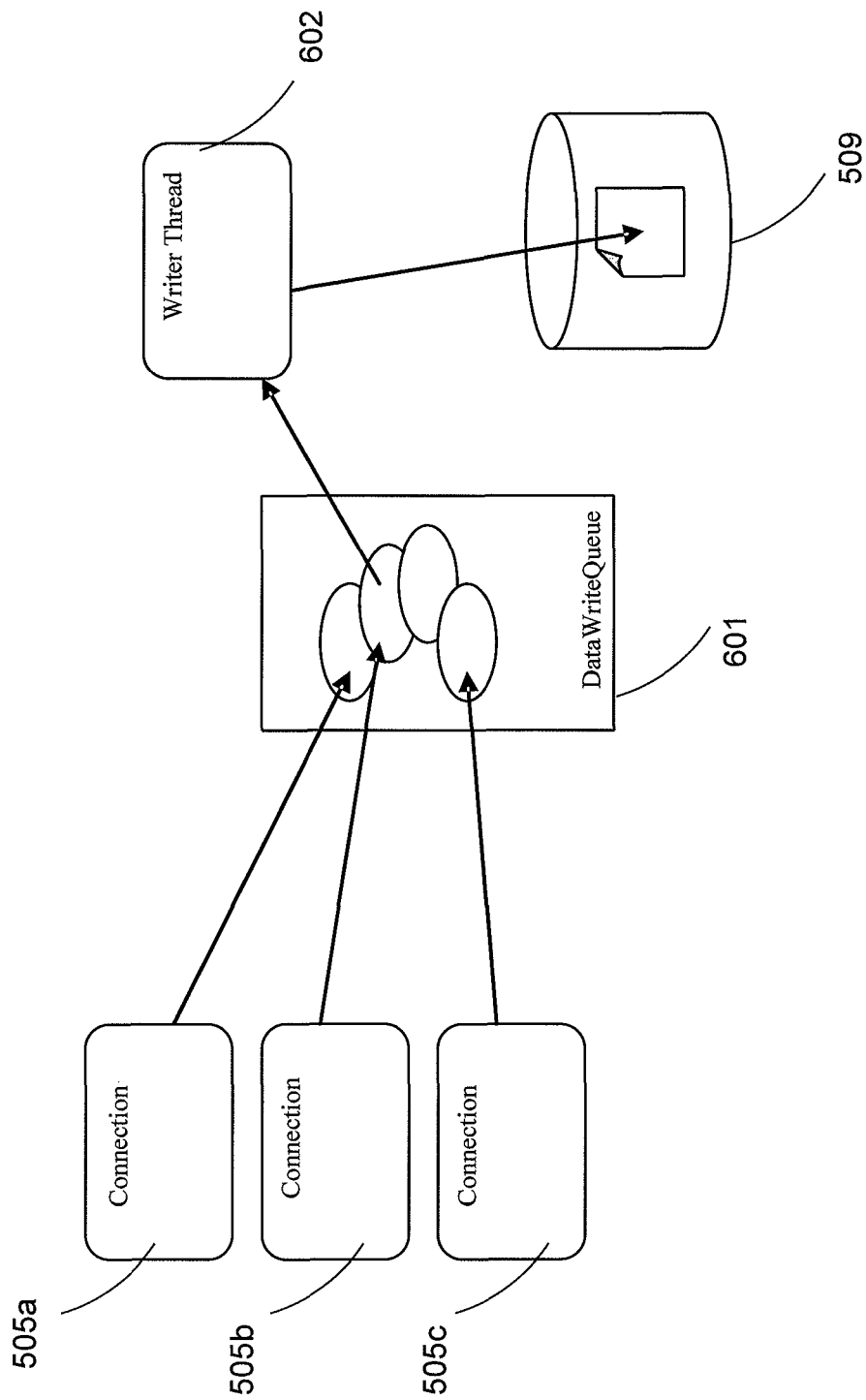
FIG. 8 is another representative view of a writing operation in an I/O storage system of the receiver of FIG. 1.

FIG. 8 is another representative view of a writing operation in an I/O storage system of the receiver 102 of FIG. 1. Generally, the multiple connections may write the data to an in-memory buffer to reassemble the data because the data may not come in sequence. By measuring I/O storage system write rates while writing the data to disk, it can be determined if the disk is busy processing requests from other applications and tasks.

As shown in FIG. 8, the writer thread 602 writes data to the file in the storage medium 509 (as shown in FIG. 5). The use of the writer thread 602 decouples the N reader threads from the file write operations. DataWriteObjects are added by the connections 505a to 505c, and are removed by the writer thread 602. The rate at which the writer thread 602 writes data to the storage medium 509 is the measured write rate for the I/O storage system.

Generally, an aggregated throughput of multiple message transfers is dependent on a reliability of the underlying transport. In both of the PDP described herein and HTTP, a small TCP or encoding exception may halt an entire message transfer, requiring the message transfer to restart from the beginning. In a scenario where the network is prone to unexpected TCP disruptions or a network card fails intermittently, either the PDP or normal HTTP may have to restart a transfer from the beginning whenever a communication error occurs. For a very large file transfer, such errors may increase the transfer time by several times. By adding reliability and recovery features to the PDP, the data transfer can be completed with almost negligible delays.

In a more particular case, when a single data part is lost during a transfer, both the file receiver and sender sides of a PDP transfer may not be able to detect the data integrity error. In this case, the transfer will complete in a successful state, but will leave corrupted data on the receiving side. By adding reliability features to the PDP transfer, a possibility of silent data integrity errors can also be reduced.

If a probability of TCP or encoding error increases linearly with a message size, then throughput of a data transfer decreases geometrically with an increased message size regardless of the protocol being used. That is, as a message size increases linearly, aggregate throughput (i.e., message transfers/unit time) decreases at a greater-than-linear rate.

One way to reduce or even possibly eliminate a throughput dependency on message size is to use an underlying transport which is reliable in the face of TCP errors and data encoding errors. If the transport can complete a transfer despite TCP or encoding errors with only a constant time loss versus time loss dependent message size, then the aggregate throughput will degrade only linearly with a message size. For larger message sizes, the aggregate throughput will increase accordingly.

The proposed reliability improvements to PDP described herein concentrate on repairing and continuing transfers with only linear time loss in the face of TCP or data encoding errors. These reliability improvements concentrate on, for example, three specific such error conditions: (1) a TCP connection loss, in which loss of one or more connections is handled gracefully, and re-creation of lost connections is also contemplated, (2) a re-send of missing/lost data chunks, and (3) a resend of corrupted data chunks.

Architecture of Receiver Positive Acknowledgment (RPA) Mechanism

Figure 9:
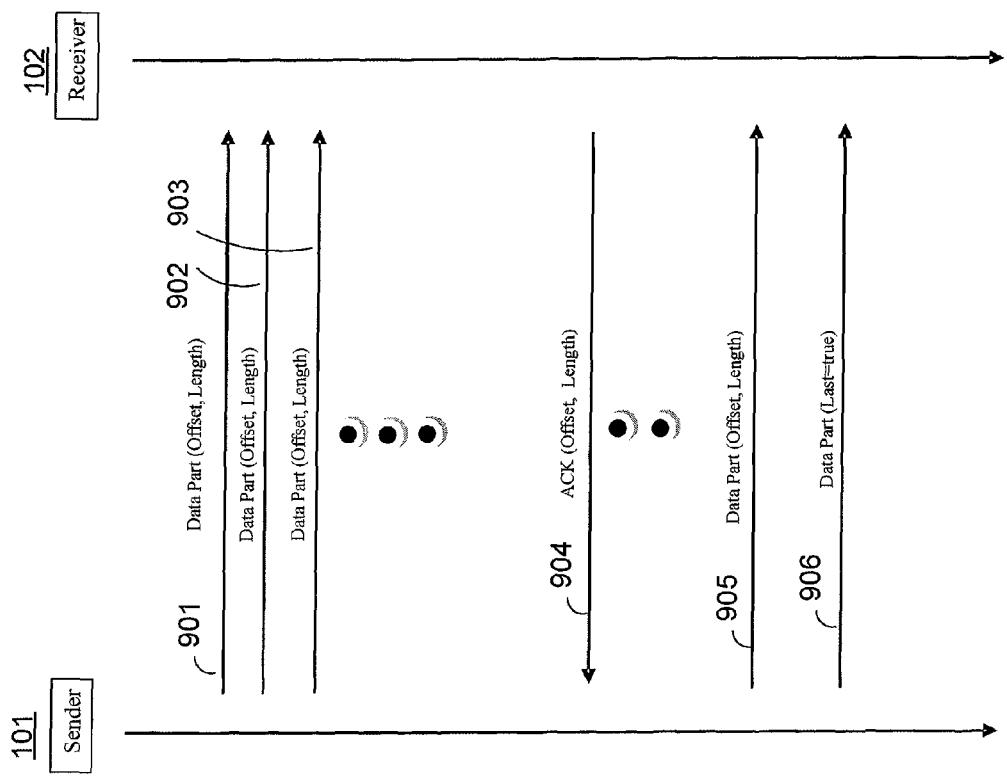
FIG. 9 is a sequence diagram for illustrating a positive receiver acknowledgment mechanism according to an example embodiment.

FIG. 9 is a sequence diagram for illustrating an RPA mechanism according to an example embodiment. Generally, enhancement of a PDP to support reliability can provide that a data sender positively deduce that all data chunks have been received by the receiver, and resend data chunks which the sender has discovered have not been delivered. This is different to data transfers in which the sender has a "fire-and-forget" style of data transfer.

One possible way to realize reliability in data transfer involves adding ACK messages to the PDP. That is, reliability can be realized in data transfer using a receiver positive acknowledgment (RPA) mechanism. In this regard, in an RPA mechanism, the data receiver sends periodic ACKs (i.e., acknowledgments) for ranges of data that the receiver has received. The sender then maintains a collection of data ranges that have been sent. The sender ends a file transfer when it has received ACKs covering an entire data range of a file. That is, the sender ends a file transfer when, for each data part the sender has sent, the receiver has returned as least one ACK covering the range of the data part. An alternative acknowledgment strategy, which may be easier to implement but may have slightly less maximum transfer efficiency, is to have the receiver send on ACK for each data part it receives. Whether a single ACK covering multiple data parts is used or whether a single ACK per data part is used, is a minor choreography difference. However, when using a single ACK for multiple data parts, if an amount of multiple data parts that the sender holds is too much, then the system can switch to a receiver negative acknowledgment (RNA) mechanism, which will be described in greater detail below in connection with FIG. 13. By switching to the RNA mechanism, the sender can implement a circular buffer queue to enable resending of data that has not been received by the receiver. In this mechanism, the receiver does not send ACK messages, which can reduce network traffic.

In FIG. 9, interleaving of sent data parts and ACK messages between a sender and a receiver is illustrated. As shown in FIG. 9, there is not necessarily a 1:1 correspondence between data part messages and ACK messages. In this regard, a single ACK message may be used to acknowledge receipt of multiple data part messages. However, if a number of data parts is set to a large number, and depending on at least, but not limited to, a sender and/or a receiver memory buffer size to cache data, the RPA mechanism can be switched to the RNA mechanism, which will be described in more detail below in connection with FIG. 13. In this case, the switchover from the RPA mechanism to the RNA mechanism may occur because the data receiver notifies the sender after a few data parts are received instead of notifying the sender after each data part is received. More specifically, the switchover may occur because the sender caches the data that is sent to and received by the receiver, and if the sender is notified after a few data parts are received, the stored data may become too large for the sender cache memory to hold. In this case, the sender will release the data from the top of the circular queue, which in principle is substantially similar to a NACK message scheme.

More particularly in FIG. 9, in step 901, a data part message is sent from the sender 101 to the receiver 102. The data part message includes an offset and a length of the data part, for a number of data parts in a series of data for which an RPA will be sent. In step 901, the data part message includes an offset and a length. In steps 902 and 903, additional data part messages of the series of data are sent from the sender 101 to the receiver 102. Once each of the data parts for a particular series of data sent from the sender 101 is received by the receiver 102, an RPA is sent from the receiver 102 to the sender 101 indicating that each data part of the series of data was received by the receiver 102 (step 904). In steps 905 and 906, data parts are continuously sent from the sender 101 to the receiver 102 until a data part message indicates that it is the last data part of the series of data.

FIGS. 10A and 10B are representative views of mechanisms for managing acknowledgments according to an example embodiment. In FIG. 10A, a first data part is removed from a master queue and sent over a connection from the sender 101 to the receiver 102. When the first data part is read from the master queue, the first data part is also stored in the sender's memory buffer as an unacknowledged data part. In this regard, each connection at the sender 101 maintains a list of data parts that have been sent over the particular connection.

In FIG. 10B, the receiver 102 acknowledges receipt of data parts. As shown in FIG. 10B, an acknowledgment is received by the sender 101 indicating that the first data part was received by the receiver 102. When the sender 101 receives the acknowledgment, the sender 101 removes the unacknowledged first data part from the sender's member buffer.

During a data transfer session, the sender 101 may, according to a heuristic determination, deduce that an unacknowledged data part should be re-sent to the receiver 102. The data parts are then copied from the unacknowledged set, and possibly read back in from the disk. The resending of data parts may be limited to a certain number of data parts, or may be limited to a time period to prevent wasting bandwidth when a receiver does not respond in a timely manner.

In an RNA mechanism, the receiver 102 sends a negative acknowledgment if the receiver 102 detects that a data part is missing after ranges of data have been received at the receiver 102. The receiver 102 may send the negative acknowledgment based on various scenarios, for example when a certain period of time has passed or when the receiver 102 cannot hold any more data and does not wish to write this data to its repository (e.g., hard disk) since it may later cause a seek operation to be performed which is costly and thus may want to be avoided.

Similar to an RPA mechanism, the sender 101 maintains a collection of data ranges that have been sent. However, in the RNA mechanism, the sender 101 caches larger ranges of data compared to the RPA mechanism because the RNA mechanism waits until a specific data part has not arrived after ranges of data parts are sent or a certain period of time has passed, while the RPA mechanism continuously notifies the sender 101 of single data parts or small groups of data parts that have been received by the receiver 102. Nevertheless, the mechanism used for resending data packets when a sender is notified that a data packet has not been received, as shown in FIGS. 10A and 10B, is substantially the same for the RNA mechanism.

Architecture of Receiver Negative Acknowledgment (RNA) Mechanism

Figure 11:
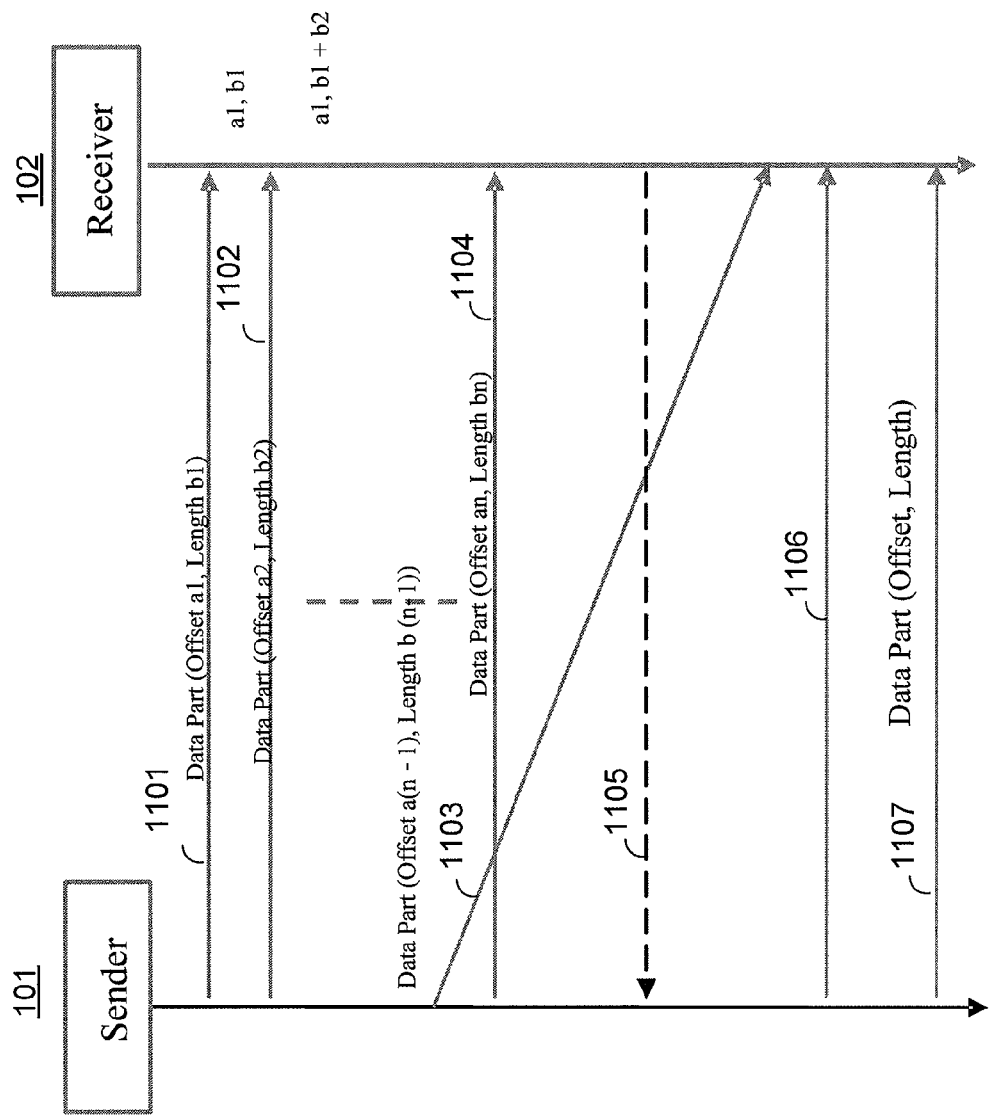
FIG. 11 is a sequence diagram for illustrating a negative receiver acknowledgment mechanism according to an example embodiment.

FIG. 11 is a sequence diagram for illustrating a negative receiver acknowledgment mechanism according to an example embodiment. In step 1101 of FIG. 11, a data part message is sent from the sender 101 to the receiver 102. The data part message includes an offset ("an") and a length ("bn") of the data part. "n" represents the number of data parts for a particular range of a series of data for which the RNA mechanism at the receiver 102 will check for missing data packets. In step 1101, the data part message includes an offset of a1, and a length of b1. In steps 1102 to 1104, additional data part messages in the range of the series of data are sent from the sender 101 to the receiver 102. More specifically, in step 1102 a data part is sent from the sender 101 to the receiver 102 with an offset of a2 and a length of b2. In step 1103, a data part is sent from the sender 101 to the receiver 102 with an offset of a(n−1) and length b(n−1), and a data part with offset an and length bn is sent from the sender 101 to the receiver 102 (step 1104). Each of the data parts sent from the sender 101 to the receiver 102 is cached in the sender's memory buffer, so as to be used in a case that a sent data packet is not received by the receiver 102.

Then, the receiver 102 determines if a length of the data parts received in steps 1101 to 1104 (i.e., a1, b1+b2+ . . . +b(n−2)) is equal to a length of data parts that should have been received (i.e., a1, b(n−1)). If it is determined that the foregoing lengths are not equal, which means that the receiver 102 possibly has not received the data, and the sender 101 and/or the receiver 102 can no longer hold data cached in their respective memory buffers, then the receiver 102 sends a negative acknowledgment to the sender 101 requesting the sender to re-send the data which was possibly not received. That is, in step 1105, the receiver 102 sends a NACK to the sender 101 that indicates an offset and length of a data range that will be re-sent by the sender 101. In step 1106, the sender 101 re-sends the data specified by the NACK, and updates the sender's memory buffer. In step 1107, the sender 101 sends a next data part for a next range of data to be sent.

Figure 12:
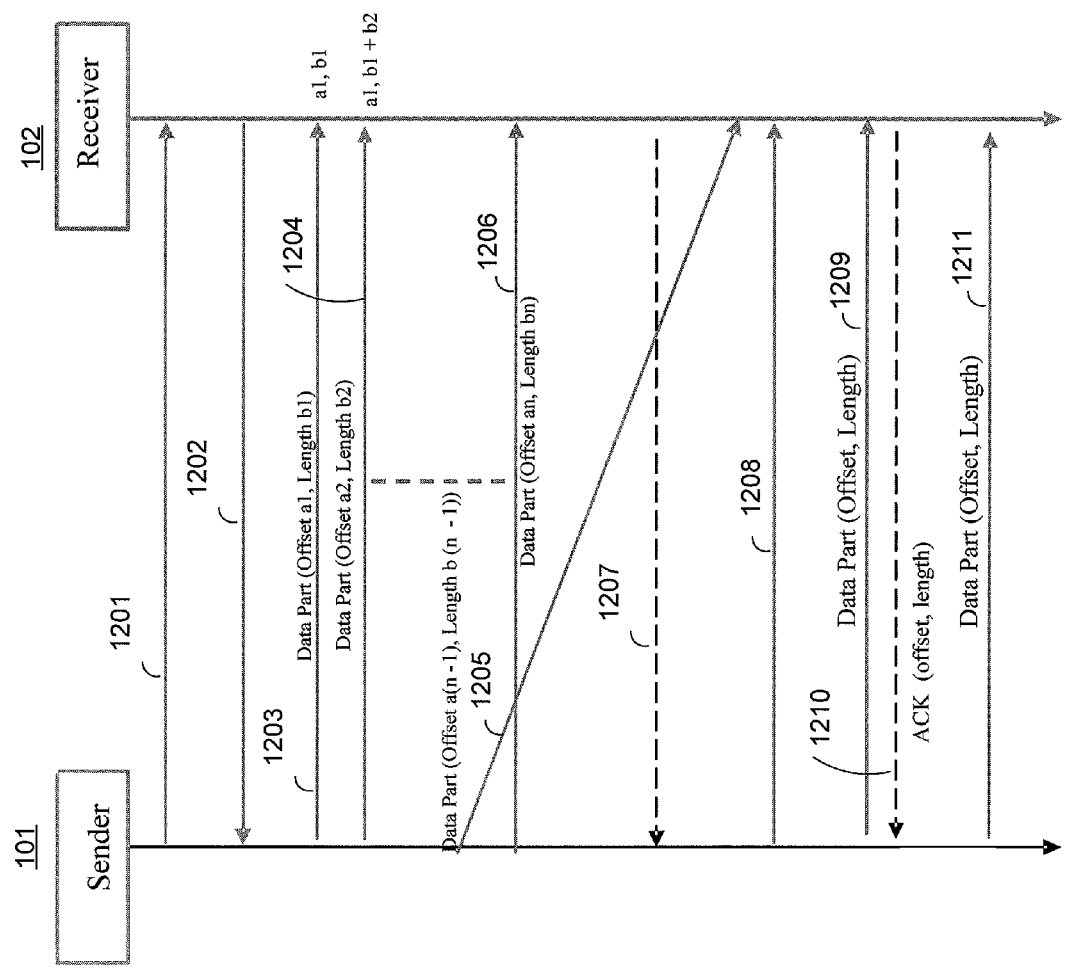
FIG. 12 is a sequence diagram for illustrating a switchover from a receiver negative acknowledgment mechanism to a receiver positive acknowledgment mechanism according to an example embodiment.

Switchover from a Receiver Negative Acknowledgment (RNA) Mechanism to a Receiver Positive Acknowledgment (RPA) Mechanism FIG. 12 is a sequence diagram for illustrating a switchover from a receiver negative acknowledgment mechanism to a receiver positive acknowledgment mechanism according to an example embodiment. Generally, when the RPA mechanism is used for message reliability and after a certain period of time, if the message arrives with low re-send rates (e.g., can be a pre-defined configurable number), in order to reduce network traffic, the receiver 102 can notify the sender 101 that the RNA mechanism can be started. In this case, the RPA mechanism changes to the RNA mechanism, in which case the receiver 102 notifies the sender 101 to re-send data when the specific data has not arrived. In some example embodiments, the sender 101 agrees with the receiver 102 that the RNA mechanism can be started before the RNA mechanism is started, and in other example embodiments, the sender 101 does not necessarily agree with the receiver 102 before the RNA mechanism is started.

In addition, with the RPA mechanism, when a re-send rate is low or the sender 101 has relative large memory available (but the available memory is not large enough to switch to the RNA mechanism), the sender 101 can increase a number of data parts per positive acknowledgment instead of one data part per acknowledgment. However, if the number of increased data parts is rather large, then the system can switch to the RNA mechanism. Alternatively, if the sender's available memory is limited, for example, then the sender 101 can decrease a number of data packets to one data packet per acknowledgment.

More specifically, in step 1201 of FIG. 12, before sending any data, the sender 101 sends a request for a connection with the receiver 102, in which the request message includes a data size to be sent and available memory in the sender for holding data. In response, in step 1202, the receiver 102 agrees to the connection, and may send a suggestion as to which mechanism should be used for acknowledgments (i.e., the RPA mechanism or the RNA mechanism). In the example embodiment as shown in FIG. 12, in step 1202, the receiver 102 suggests using the RNA mechanism. Then, in step 1203, the sender 101 sends a data part message which includes an offset a1, length b1, and the data message is received at the receiver 102. The data included in the data part message is also cached in a circular queue memory buffer included at the sender 101. In step 1204, the sender 101 sends a second data part message which includes an offset a2, length b2. The second sent data part is also cached in the circular memory buffer to continuously update the data held in the buffer. In steps 1205 and 1206, the sender 101 continues to send data parts until the data part message includes an offset a(n−1), length b(n−1), and finally includes an offset an, length bn.

In step 1207, the receiver 102 may determine that a length of (a1, b1+b2 . . . +b(n−2) does not equal to (a1, b(n−1)), and the receiver 102 sends a negative acknowledgment message to the sender 101 to re-send data that may have not been received by the receiver 102 based on the determination, if the memory buffer of the sender 101 and/or receiver 102 cannot hold more data. In addition, the receiver 102 may suggest that the sender 101 switch to the RPA mechanism based on factors described in detail below in connection with FIG. 13. In step 1208, the sender 101 re-sends the data specified by the receiver 102, together with information for switching from the RNA mechanism to the RPA mechanism. In step 1209, the sender 101 sends a data part message with an offset and length, using the RPA mechanism. In step 1210, the receiver 102 sends a positive acknowledgment for the received data part message. In step 1211, the sender 101 sends another data part message with an offset and length to the receiver 102.

Switchover from a Receiver Positive Acknowledgment (RPA) Mechanism to a Receiver Negative Acknowledgment (RNA) Mechanism When switching from an RPA mechanism to an RNA mechanism, the steps in making the switch are substantially similar to the steps described above in connection with FIG. 12; however, the mechanism starts as the RPA mechanism and switches to the RNA mechanism. Generally, when the RNA mechanism is used for message reliability, after a certain amount of time, if a message arrives with high re-send rates (a rate above the pre-defined rate for RNA), in order to reduce an amount of un-realized data held by the sender 101, the receiver 102 notifies the sender 101 that the RPA mechanism can be started. In this case, the RNA mechanism is switched to the RPA mechanism, in which case the receiver 102 notifies the sender 101 for each group of data parts received by the receiver 102. In some example embodiments, the sender 101 agrees with the receiver 102 that the RPA mechanism can be started before the RPA mechanism is started, and in other example embodiments, the sender 101 does not agree with the receiver 102 before the RPA mechanism is started.

In addition, with the RNA mechanism, when a re-send rate is quite low and the sender's memory is large enough, then the sender can determine to hold more data parts for the negative acknowledgment, which will possibly increase message reliability.

In a case that the receiver's I/O storage system is a bottleneck to a transfer of data, using the adaptive acknowledgment software 336, 236, the receiver and the sender can perform the following tasks: (1) the receiver can identify scenarios and make decisions to switch between mechanisms, and (2) the receiver can notify the sender of the decision and the sender can accept the suggest. For example, by calculating the offset and length values from received data parts, the receiver may determine that a few out of order data parts have been received, which may imply that the disk I/O storage system of the receiver may be a bottleneck, the receiver can suggest to switch from an RNA mechanism to an RPA mechanism.

Generally, the sender 101 may utilize a round-trip time (RTT) to find network performance. Modern TCP implementations seek to answer this question by monitoring the normal exchange of data packets and developing an estimate of how long is "too long". This process is called round trip time (RTT) estimation. RTT estimates are an important performance parameter in a TCP exchange, especially in an indefinitely large transfer, in which most TCP implementations eventually drop packets and retransmit them, regardless of the good quality of the link. If the RTT estimate is too low, packets are retransmitted unnecessarily; if the RTT estimate is too high, the connection can sit idle while the host waits to timeout. The current RTT and the previous RTT can be based on RTTs for more than one message package, or can be based on a weighted average of RTTs. When the sender 101 finds that the RTT time of message packages sent to the receiver 102 is taking longer than the previous message packages, it may indicate that the network is busy and has more traffic. In this case, the sender 101 and the receiver 102 may switch, for example, from using the RPA mechanism to using the RNA mechanism. When the sender 101 finds that the RTT time of message packages sent to the receiver 102 is taking shorter than the previous message packages, it may indicate that the network does not have much traffic. In this case, the sender 101 and the receiver 102 may switch, for example, from using the RNA mechanism to using the RPA mechanism, if the re-send rate is relatively high.

Adaptive Acknowledgment Mechanism for Network Communication

Figure 13:
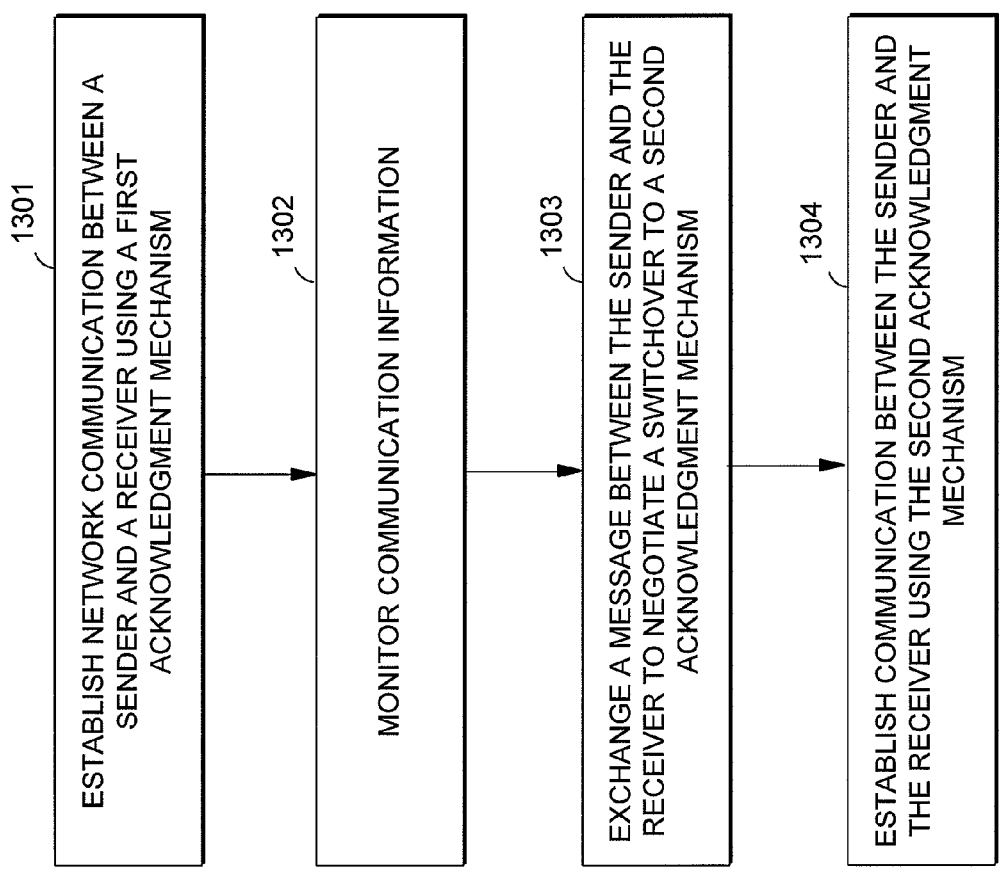
FIG. 13 is a flow chart for providing a detailed explanation of another example embodiment.

FIG. 13 is a flow chart for providing a detailed explanation of another example embodiment. More specifically, FIG. 13 depicts a flowchart for providing a detailed explanation of an example embodiment for mass transfer of data from a sender 101 to a receiver 102 connected to the sender 101 via a network 120 as shown in FIG. 1.

As shown in FIG. 13, in step 1301, network communication is established between the sender 101 and the receiver 102 using a first acknowledgment mechanism for signifying receipt of data by the receiver 102. The first acknowledgment mechanism is selected from one of a receiver positive acknowledgment mechanism (RPA) and a receiver negative acknowledgment mechanism (RNA). The selection of the particular mechanism to use for network communication can be suggested by the receiver 102 at the time network communication is established.

In step 1302, communication information is monitored, which indicates at least a current state of performance for network communication between the sender 101 and the receiver 102. The communication information includes at least one of a count of re-send operations for failed transmissions from sender to receiver, a monitor of network bandwidth relative to an I/O storage system at the receiver, and a monitor of available memory at the sender for caching of unacknowledged data packets. The count of re-send operations for failed transmissions from the sender to receiver is gathered by the sender 101. The monitor of network bandwidth can be performed, for example, by the sender 101, by observing RTTs for sent data packets. A performance of the I/O storage system at the receiver can be monitored, for example, by the receiver 102, by observing a count of seek operations performed or by measuring a write rate of the I/O storage system. The sender 101 can determine its available memory for caching of unacknowledged data packets by, for example, comparing an amount of fixed memory with a size of data to be transferred. A detailed description of examples for monitoring a network bandwidth, monitoring an I/O storage system of a sender, and monitoring an I/O storage system of a receiver, can be found in above-mentioned U.S. Application titled "Mechanism for Autotuning Mass Data Transfer from a Sender to a Receiver Over Parallel Connections" Ser. No. 12/873,305.

In step 1303, based on the communication information, a message is exchanged between the sender 101 and the receiver 102 to negotiate a switchover to a second acknowledgment mechanism for signifying receipt of data by the receiver 102. The second acknowledgment mechanism is selected from the other of the receiver positive acknowledgment mechanism (RPA) and the receiver negative acknowledgment mechanism (RNA).

In step 1302, the monitoring of communication information is performed repeatedly by the sender 101 and by the receiver 102, so as to trigger a renegotiation of an acknowledgment mechanism responsive to significant changes in communication information. Thus, if any of the communication information changes to the extent that the communication performance is effected using the current acknowledgment mechanism, then the sender 101 and the receiver 102 can renegotiate to possibly switch acknowledgment mechanisms again.

In step 1303, the sender 101 and the receiver 102 may negotiate a switchover from an RNA mechanism to an RPA mechanism responsive to a determination that the count of re-send operations exceeds a threshold count. The threshold count can be a pre-defined value, which is determined based on, for example, a size of the data being transferred, available memory for a set buffer size at the sender and/or receiver, a current condition of network congestion, and/or a number of available sockets at the sender and/or receiver. For example, a high threshold count may be applied for a rather large size of data being transferred, while a lower threshold count may be applied for a smaller size of data being transferred. In another example, the threshold count may be high when there is plenty of available memory for a set buffer size at the sender and/or receiver, and the threshold count may be lower when there is limited available memory for the set buffers size at the sender and/or receiver. In addition, if the current condition of network congestion is substantially congested, then the threshold count might be, for example, a high threshold count. Alternatively, if the current condition of network congestion is substantially free of congestion, then the threshold count might be, for example, a low threshold count. Lastly, if there are a large number of available sockets at the sender and/or receiver on which to send data, then the threshold count might be, for example, a high threshold count. On the other hand, if there are a limited number of available sockets at the sender and/or receiver on which to send data, then the threshold count might be, for example, a low threshold count.

In addition, in step 1303, the sender 101 and the receiver 102 may negotiate a switchover from an RNA mechanism to an RPA mechanism responsive to a determination that the monitor of network bandwidth outperforms the I/O storage system of the receiver 102. In this regard, if the network bandwidth is outperforming the I/O storage system of the receiver 102, then there is probably enough available bandwidth to send many positive acknowledgments without detrimentally affecting the network. In addition, switching from the RNA mechanism to the RPA mechanism reduces an amount of data that is stored by the I/O storage system, which reduces an effect on the performance of the I/O storage system.

Lastly, in step 1303, the sender 101 and the receiver 102 may negotiate a switchover from an RNA mechanism to an RPA mechanism responsive to a determination that the sender 101 has insufficient memory for caching of unacknowledged data packets. The sender 101 may be determined as having insufficient memory for caching of unacknowledged data packets if, for example, the sender 101 is having to unload stored unacknowledged data packets before the receiver 102 can determine whether a data packet has not been received using the RNA mechanism.

Alternatively, in step 1303, the sender 101 and the receiver 102 may negotiate a switchover from an RPA mechanism to an RNA mechanism responsive to a determination that the count of re-send operations remains lower than a threshold count. Similar to the threshold count in the case of switching from an RNA mechanism to an RPA mechanism, the threshold count can be a pre-defined value, which is determined based on, for example, a size of the data being transferred, available memory for a set buffer size at the sender and/or receiver, a current condition of network congestion, and/or a number of available sockets at the sender and/or receiver.

In addition, in step 1303, the sender 101 and the receiver 102 may negotiate a switchover from an RPA mechanism to an RNA mechanism responsive to a determination that the monitor of the I/O storage system of the receiver 102 outperforms network bandwidth. In this case, if the network bandwidth is being outperformed by the I/O storage system of the receiver 102, then the network possibly has a lot of traffic. Here, the RNA mechanism can be used to avoid introducing unnecessary traffic to the network caused by sending the positive acknowledgments for each data parts received.

Lastly, in step 1303, the sender 101 and the receiver 102 may also negotiate a switchover from an RPA mechanism to an RNA mechanism responsive to a determination that the sender 101 has adequate memory for caching of unacknowledged data packets. Since the sender 101 has adequate memory for caching of unacknowledged data packets, the RNA mechanism can be used so as to avoid introducing unnecessary traffic to the network caused by sending positive acknowledgments for a range of data parts received.

In some situations, messages are exchanged between the sender 101 and the receiver 102 to negotiate a mutual agreement between the sender 101 and the receiver 102 for a switchover to a second acknowledgment mechanism for signifying receipt of data by the receiver. For example, in a situation where the receiver determines that the receiver's I/O storage system is outperforming network bandwidth and that the count of re-send operations remains lower than a threshold count during operation in an RPA mechanism, the receiver will send a message to the sender requesting a switch-over to the RNA mechanism. If the sender agrees, for example, in a situation where it determines that it has a sufficiently large memory for caching unacknowledged data packets, then the sender will send a message to the receiver signifying a switch-over to the RNA mechanism.

In step 1304, based on the negotiation between the sender 101 and the receiver 102, network communication is established between the sender and the receiver using the second acknowledgment mechanism. For example, if the RNA mechanism is initially being used for network communication, and the sender 101 and the receiver 102 negotiate a switchover, then network communication is subsequently performed using the RPA mechanism, and vice versa.

By virtue of the foregoing example embodiment, it is ordinarily possible to reduce acknowledgment-related traffic over a network when sending data from a sender to a receiver, without negatively affecting reliability of the data transfer. More specifically, in a case where a data loss ratio is low, network traffic, caused at least partially by receiver positive acknowledgments, can be reduced by negotiating a switchover from an RPA mechanism to an RNA mechanism. In addition, an advantageous effect can be obtained by the foregoing arrangement in that a reduction can be made to an amount of data needed to be stored by the sender. More particularly, in a case where a data loss ratio is high and the sender has low memory available to hold data, a reduction can be made to an amount of data to be stored by the sender by negotiating a switchover from an RNA mechanism to an RPA mechanism. As a result of the foregoing, a hybrid system is provided that switches between RPA and RNA mechanisms based on system performance information, so as to efficiently transfer data from a sender to a receiver while maintaining reliability of receipt of the transferred data.

In some cases, the sender 101 and the receiver 102 communicate over multiple data transport channels simultaneously. In these cases, the communication information includes at least a monitor of aggregated network bandwidth relative to an I/O storage system at the receiver 102 and/or an I/O storage system at the sender 101. Generally, if the aggregated network bandwidth is substantially high, then the RPA mechanism can be used to provide greater reliability for sent data, so long as the I/O storage system of the sender 101 and/or the I/O storage system of the receiver 102 can handle the processing of positive acknowledgments.

In the foregoing cases in which the sender 101 and the receiver 102 communicate over multiple data transport channels simultaneously, the sender 101 and the receiver 102 may negotiate a switchover from an RNA mechanism to an RPA mechanism responsive to a determination that the monitor of aggregated network bandwidth outperforms the I/O storage system of the receiver 102. In addition, in the foregoing cases, the sender 101 and the receiver 102 may negotiate a switchover from an RPA mechanism to an RNA mechanism responsive to a determination that the monitor of the I/O storage system of the receiver 102 outperforms aggregated network bandwidth. Each of the switchover negotiation from an RNA mechanism to an RPA mechanism and the switchover negotiation from an RPA mechanism to an RNA mechanism is based at least partially on an available memory at the receiver 102 for caching data packets. For example, if there is a large amount of available memory at the receiver 102 for caching data packets, then the RNA mechanism can be used which utilizes a larger amount of memory at the receiver than the RPA mechanism. Alternatively, in the foregoing example, if there is a small amount of available memory at the receiver 102 for caching data packets, then the RPA mechanism can be used which requires less memory at the sender than the RNA mechanism.

In some situations, the negotiation of a switchover to the second acknowledgment mechanism is a progressive negotiation. In an RPA mechanism, a single RPA message signifies receipt of more than one data packet. Thus, in an example of implementing the progressive negotiation, when the re-send count is low compared to a threshold count, or the sender has a relatively large amount of memory available (but the available memory is not large enough to switch to an RNA mechanism), the sender can increase the number of data packets per RPA message. Alternatively, in the foregoing example, if the sender's available memory is limited and the network bandwidth is outperforming an I/O storage system of the receiver, the sender can decrease the number of data packets per RPA message.

In the foregoing situation, in an RNA mechanism, the sender 101 makes a determination to increase or decrease an amount of sent data packets to store in a memory, based on a re-send count and a size of the memory at the sender 101.

Thus, in another example of a progressive negotiation, the size of the memory buffer of the sender 101 can progressively increase or decrease when using the RNA mechanism.

In the foregoing example embodiments, network communication can be effected in multiple layers that include a transport layer or an application layer. Accordingly, monitoring communication information and negotiating a switchover to a different acknowledgment mechanism are effected at the transport layer. Alternatively, monitoring communication information and negotiating a switchover to a different acknowledgment mechanism can be effected at the application layer. One advantage to effecting the monitoring of communication information and the negotiating of a switchover to a different acknowledgment mechanism at the application layer is that it is easy for the application to monitor the communication information. On the other hand, when effecting the monitoring of communication information and negotiating of a switchover to a different acknowledgment mechanism at the transport level, it may be more difficult to monitor the communication information.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for network communication between a sender and a receiver, comprising:
    establishing network communication between the sender and the receiver using a first acknowledgment mechanism for signifying receipt of data by the receiver, wherein the first acknowledgment mechanism is selected from one of a receiver positive acknowledgment mechanism (RPA) and a receiver negative acknowledgment mechanism (RNA);
    monitoring communication information which indicates at least a current state of performance for network communication between the sender and the receiver;
    based on the communication information, exchanging a message between the sender and the receiver to negotiate a switchover to a second acknowledgment mechanism for signifying receipt of data by the receiver, wherein the second acknowledgment mechanism is selected from the other of the receiver positive acknowledgment mechanism (RPA) and the receiver negative acknowledgment mechanism (RNA); and
    based on the negotiation between the sender and the receiver, establishing network communication between the sender and the receiver using the second acknowledgment mechanism.

2. The method according to claim 1, wherein the communication information includes at least one of a count of re-send operations for failed transmissions from sender to receiver, a monitor of network bandwidth relative to an I/O storage system at the receiver, and a monitor of available memory at the sender for caching of unacknowledged data packets.

3. The method according to claim 2, wherein the sender and the receiver negotiate a switchover from an RNA mechanism to an RPA mechanism responsive to a determination that the count of re-send operations exceeds a threshold count, or a determination that the monitor of network bandwidth outperforms the I/O storage system of the receiver, or a determination that the sender has insufficient memory for caching of unacknowledged data packets.

4. The method according to claim 2, wherein the sender and the receiver negotiate a switchover from an RPA mechanism to an RNA mechanism responsive to a determination that the count of re-send operations remains lower than a threshold count, or a determination that the monitor of the I/O storage system of the receiver outperforms network bandwidth, or a determination that the sender has adequate memory for caching of unacknowledged data packets.

5. The method according to claim 1, wherein messages are exchanged between the sender and the receiver to negotiate a mutual agreement between the sender and the receiver for a switchover to a second acknowledgment mechanism for signifying receipt of data by the receiver.

6. The method according to claim 1, wherein the step of monitoring communication information is performed repeatedly by the sender and by the receiver, so as to trigger a renegotiation of an acknowledgment mechanism responsive to significant changes in communication information.

7. The method according to claim 1, wherein the sender and the receiver communicate over multiple data transport channels simultaneously, and
    wherein the communication information includes at least a monitor of aggregated network bandwidth relative to an I/O storage system at the receiver and/or an I/O storage system at the sender.

8. The method according to claim 7, wherein the sender and the receiver negotiate a switchover from an RNA mechanism to an RPA mechanism responsive to a determination that the monitor of aggregated network bandwidth outperforms the I/O storage system of the receiver, and negotiate a switchover from an RPA mechanism to an RNA mechanism responsive to a determination that the monitor of the I/O storage system of the receiver outperforms aggregated network bandwidth,
    wherein each of the switchover negotiation from an RNA mechanism to an RPA mechanism and the switchover negotiation from an RPA mechanism to an RNA mechanism is based at least partially on an available memory at the receiver for caching data packets.

9. The method according to claim 1, wherein the negotiation of a switchover to the second acknowledgment mechanism is a progressive negotiation.

10. The method according to claim 9, wherein in an RPA mechanism, a single RPA message signifies receipt of more than one data packet.

11. The method according to claim 9, wherein in an RNA mechanism, the sender makes a determination to increase or decrease an amount of sent data packets to store in a memory, based on a re-send count and a size of the memory at the sender.

12. The method according to claim 1, wherein network communication is effected in multiple layers that include a transport layer or an application layer, and wherein the steps of monitoring communication information and negotiating a switchover to a different acknowledgment mechanism are effected at the transport layer.

13. The method according to claim 1, wherein network communication is effected in multiple layers that include a transport layer or an application layer, and wherein the steps of monitoring communication information and negotiating a switchover to a different acknowledgment mechanism are effected at the application layer.

14. A method for network communication between a sender and a receiver, wherein the sender performs steps comprising:
    establishing network communication between the sender and the receiver using a first acknowledgment mechanism for signifying receipt of data by the receiver, wherein the first acknowledgment mechanism is selected from one of a receiver positive acknowledgment mechanism (RPA) and a receiver negative acknowledgment mechanism (RNA);

monitoring communication information which indicates at least a current state of performance for network communication between the sender and the receiver, wherein the communication information includes at least one of a count of re-send operations for failed transmissions from sender to receiver, and a monitor of available memory at the sender for caching of unacknowledged data packets;

responsive to a determination that the count of re-send operations exceeds a threshold count, or a determination that the sender has insufficient memory for caching of unacknowledged data packets, sending a message to the receiver to negotiate a switchover from an RNA mechanism to an RPA mechanism;

responsive to a determination that the count of re-send operations remains lower than a threshold count, or a determination that the sender has adequate memory for caching of unacknowledged data packets, sending a message to the receiver to negotiate a switchover from an RPA mechanism to an RNA mechanism;

receiving a message from the receiver indicating agreement to switchover to a second acknowledgment mechanism for signifying receipt of data by the receiver, wherein the second acknowledgment mechanism is selected from the other of the receiver positive acknowledgment mechanism (RPA) and the receiver negative acknowledgment mechanism (RNA); and based on the negotiation of a mutual agreement between the sender and the receiver, establishing network communication between the sender and the receiver using the second acknowledgment mechanism.

15. A method for network communication between a sender and a receiver, wherein the receiver performs steps comprising:

establishing network communication between the sender and the receiver using a first acknowledgment mechanism for signifying receipt of data by the receiver, wherein the first acknowledgment mechanism is selected from one of a receiver positive acknowledgment mechanism (RPA) and a receiver negative acknowledgment mechanism (RNA);

monitoring communication information which indicates at least a current state of performance for network communication between the sender and the receiver, wherein the communication information includes at least a monitor of network bandwidth relative to an I/O storage system at the receiver;

responsive to a determination that the monitor of network bandwidth outperforms the I/O storage system of the receiver, sending a message to the sender to negotiate a switchover from an RNA mechanism to an RPA mechanism;

responsive to a determination that the monitor of the I/O storage system of the receiver outperforms network bandwidth, sending a message to the sender to negotiate a switchover from an RPA mechanism to an RNA mechanism;

receiving a message from the sender indicating agreement to switchover to a second acknowledgment mechanism for signifying receipt of data by the receiver, wherein the second acknowledgment mechanism is selected from the other of the receiver positive acknowledgment mechanism (RPA) and the receiver negative acknowledgment mechanism (RNA); and based on the negotiation of a mutual agreement between the sender and the receiver, establishing network communication between the sender and the receiver using the second acknowledgment mechanism.

16. A communication endpoint comprising:

a computer-readable memory constructed to store computer-executable process steps; and a processor constructed to execute the computer-executable process steps stored in the memory, wherein the process steps in the memory cause the processor to perform network communication between a sender and a receiver, and wherein the process steps stored in the memory include computer-executable steps to:

establish network communication between the sender and the receiver using a first acknowledgment mechanism for signifying receipt of data by the receiver, wherein the first acknowledgment mechanism is selected from one of a receiver positive acknowledgment mechanism (RPA) and a receiver negative acknowledgment mechanism (RNA);

monitor communication information which indicates at least a current state of performance for network communication between the sender and the receiver;

based on the communication information, exchange a message between the sender and the receiver to negotiate a switchover to a second acknowledgment mechanism for signifying receipt of data by the receiver, wherein the second acknowledgment mechanism is selected from the other of the receiver positive acknowledgment mechanism (RPA) and the receiver negative acknowledgment mechanism (RNA); and based on the negotiation between the sender and the receiver, establish network communication between the sender and the receiver using the second acknowledgment mechanism.

17. The communication endpoint according to claim 16, wherein the communication information includes at least one of a count of re-send operations for failed transmissions from sender to receiver, a monitor of network bandwidth relative to an I/O storage system at the receiver, and a monitor of available memory at the sender for caching of unacknowledged data packets.

18. The communication endpoint according to claim 17, wherein the sender and the receiver negotiate a switchover from an RNA mechanism to an RPA mechanism responsive to a determination that the count of re-send operations exceeds a threshold count, or a determination that the monitor of network bandwidth outperforms the I/O storage system of the receiver, or a determination that the sender has insufficient memory for caching of unacknowledged data packets.

19. The communication endpoint according to claim 17, wherein the sender and the receiver negotiate a switchover from an RPA mechanism to an RNA mechanism responsive to a determination that the count of re-send operations remains lower than a threshold count, or a determination that the monitor of the I/O storage system of the receiver outperforms network bandwidth, or a determination that the sender has adequate memory for caching of unacknowledged data packets.

20. The communication endpoint according to claim 16, wherein messages are exchanged between the sender and the receiver to negotiate a mutual agreement between the sender and the receiver for a switchover to a second acknowledgment mechanism for signifying receipt of data by the receiver.

21. The communication endpoint according to claim 16, wherein the step of monitoring communication information is performed repeatedly by the sender and by the receiver, so as to trigger a renegotiation of an acknowledgment mechanism responsive to significant changes in communication information.

22. The communication endpoint according to claim 16, wherein the sender and the receiver communicate over multiple data transport channels simultaneously, and
wherein the communication information includes at least a monitor of aggregated network bandwidth relative to an I/O storage system at the receiver and/or an I/O storage system at the sender.

23. The communication endpoint according to claim 22, wherein the sender and the receiver negotiate a switchover from an RNA mechanism to an RPA mechanism responsive to a determination that the monitor of aggregated network bandwidth outperforms the I/O storage system of the receiver, and negotiate a switchover from an RPA mechanism to an RNA mechanism responsive to a determination that the monitor of the I/O storage system of the receiver outperforms aggregated network bandwidth,
wherein each of the switchover negotiation from an RNA mechanism to an RPA mechanism and the switchover negotiation from an RPA mechanism to an RNA mechanism is based at least partially on an available memory at the receiver for caching data packets.

24. The communication endpoint according to claim 16, wherein the negotiation of a switchover to the second acknowledgment mechanism is a progressive negotiation.

25. The communication endpoint according to claim 24, wherein in an RPA mechanism, a single RPA message signifies receipt of more than one data packet.

26. The communication endpoint according to claim 24, wherein in an RNA mechanism, the sender makes a determination to increase or decrease an amount of sent data packets to store in a memory, based on a re-send count and a size of the memory at the sender.

27. The communication endpoint according to claim 16, wherein network communication is effected in multiple layers that include a transport layer or an application layer, and wherein the steps of monitoring communication information and negotiating a switchover to a different acknowledgment mechanism are effected at the transport layer.

28. The communication endpoint according to claim 16, wherein network communication is effected in multiple layers that include a transport layer or an application layer, and wherein the steps of monitoring communication information and negotiating a switchover to a different acknowledgment mechanism are effected at the application layer.

29. A computer-readable memory medium on which is stored computer-executable process steps for causing a processor to perform network communication between a sender and a receiver, the process steps comprising:
establishing network communication between the sender and the receiver using a first acknowledgment mechanism for signifying receipt of data by the receiver, wherein the first acknowledgment mechanism is selected from one of a receiver positive acknowledgment mechanism (RPA) and a receiver negative acknowledgment mechanism (RNA);
monitoring communication information which indicates at least a current state of performance for network communication between the sender and the receiver;
based on the communication information, exchanging a message between the sender and the receiver to negotiate a switchover to a second acknowledgment mechanism for signifying receipt of data by the receiver, wherein the second acknowledgment mechanism is selected from the other of the receiver positive acknowledgment mechanism (RPA) and the receiver negative acknowledgment mechanism (RNA); and
based on the negotiation between the sender and the receiver, establishing network communication between the sender and the receiver using the second acknowledgment mechanism.

* * * * *